United States Patent
Sakai

(10) Patent No.: US 11,832,012 B2
(45) Date of Patent: Nov. 28, 2023

(54) PHOTOELECTRIC CONVERSION DEVICE

(71) Applicant: CANON KABUSHIKI KAISHA, Tokyo (JP)

(72) Inventor: Seiichirou Sakai, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/812,253

(22) Filed: Jul. 13, 2022

(65) Prior Publication Data

US 2023/0039905 A1    Feb. 9, 2023

(30) Foreign Application Priority Data

Aug. 4, 2021 (JP) .................................. 2021-128523

(51) Int. Cl.
| | | |
|---|---|---|
| *H04N 5/77* | (2006.01) | |
| *H04N 25/772* | (2023.01) | |
| *H04N 25/75* | (2023.01) | |
| *H04N 25/771* | (2023.01) | |

(52) U.S. Cl.
CPC .......... *H04N 25/772* (2023.01); *H04N 25/75* (2023.01); *H04N 25/771* (2023.01)

(58) Field of Classification Search
CPC ..... H04N 25/772; H04N 25/75; H04N 25/771
See application file for complete search history.

(56) References Cited

U.S. PATENT DOCUMENTS

| | | |
|---|---|---|
| 7,629,568 B2 | 12/2009 | Koizumi |
| 7,906,755 B2 | 3/2011 | Koizumi |
| 8,053,718 B2 | 11/2011 | Koizumi |
| 8,106,343 B2 | 1/2012 | Arishima |
| 8,582,003 B2 | 11/2013 | Sakai |
| 8,872,092 B2 | 10/2014 | Ryoki |
| 8,957,364 B2 | 2/2015 | Ryoki |
| 9,093,351 B2 | 7/2015 | Sakai |
| 9,253,425 B2 | 2/2016 | Ryoki |
| 9,300,889 B2 * | 3/2016 | Hashimoto ............ H04N 25/57 |
| 9,667,901 B2 | 5/2017 | Sakai |
| 9,681,076 B2 | 6/2017 | Oguro |
| 9,762,840 B2 | 9/2017 | Yamazaki |
| 10,319,765 B2 | 6/2019 | Kato |
| 10,979,067 B2 | 4/2021 | Sakai |

(Continued)

FOREIGN PATENT DOCUMENTS

| | | |
|---|---|---|
| JP | 2008-252605 A | 10/2008 |
| JP | 2014-140152 A | 7/2014 |

(Continued)

*Primary Examiner* — Ahmed A Berhan
*Assistant Examiner* — Fayez A Bhuiyan
(74) *Attorney, Agent, or Firm* — VENABLE LLP

(57) ABSTRACT

A photoelectric conversion device may operate in a first to third driving modes. In the first driving mode in which a correction value is acquired, an analog-to-digital conversion unit compares a first analog signal with a reference signal to acquire the correction value. In the second driving mode in which a pixel signal is read, a reading condition is set based on a result of comparing the pixel signal with a threshold signal. In the third driving mode, at least one of the first analog signal and the threshold signal is controlled to reduce a difference between a potential of the first analog signal and a potential of the threshold signal.

20 Claims, 31 Drawing Sheets

(56) References Cited

U.S. PATENT DOCUMENTS

| | | |
|---|---|---|
| 11,115,608 B2 | 9/2021 | Sakai |
| 2008/0239124 A1 | 10/2008 | Mori et al. |
| 2012/0105670 A1 | 5/2012 | Arishima |
| 2014/0117211 A1 | 5/2014 | Arishima |
| 2014/0175263 A1 | 6/2014 | Muto et al. |
| 2014/0293085 A1 | 10/2014 | Hashimoto et al. |
| 2018/0109736 A1 | 4/2018 | Ishii et al. |
| 2019/0104264 A1* | 4/2019 | Totsuka ................. H04N 25/50 |
| 2020/0314360 A1 | 10/2020 | Sakai et al. |

FOREIGN PATENT DOCUMENTS

| | | |
|---|---|---|
| JP | 2015-164278 A | 9/2015 |
| JP | 2017-79464 A | 4/2017 |
| JP | 2018-67776 A | 4/2018 |
| JP | 2020-167544 A | 10/2020 |

* cited by examiner

PHOTOELECTRIC CONVERSION DEVICE

BACKGROUND OF THE INVENTION

Field of the Invention

The present disclosure relates to a photoelectric conversion device.

Description of the Related Art

Japanese Patent Application Laid-Open No. 2014-140152 discloses an imaging device having an analog-to-digital (AD) conversion unit. The AD conversion unit includes a reference signal supply unit that outputs a first reference signal whose potential changes with a first change amount per unit time and a second reference signal whose potential changes with a second change amount greater than the first change amount per unit time. The AD conversion unit switches the first reference signal and the second reference signal according to an amount of incident light and performs AD conversion to generate a digital signal. Japanese Patent Application Laid-Open No. 2014-140152 describes a technique for correcting an error in a digital signal caused by a variation in a ratio of a change amount of a potential per unit time of a first reference signal to a change amount of a potential per unit time of a second reference signal.

Japanese Patent Application Laid-Open No. 2017-079464 describes a technique for performing AD conversion by switching a gain of an amplifying circuit for amplifying a signal from a pixel according to an amount of incident light. Japanese Patent Application Laid-Open No. 2017-079464 describes a technique for correcting an error in a digital signal caused by a variation in gain ratio.

In the signal correction techniques after AD conversion as described in Japanese Patent Application Laid-Open No. 2014-140152 and Japanese Patent Application Laid-Open No. 2017-079464, there is a demand for a technique that can further reduce the correction error in order to improve the signal quality.

SUMMARY OF THE INVENTION

An object of the present disclosure is to provide a photoelectric conversion device capable of further reducing a correction error.

According to an aspect of the present disclosure, there is provided a photoelectric conversion device including a pixel configured to output a signal corresponding to an amount of received light, a reference signal supply unit configured to output a first reference signal whose potential changes depending on time and a second reference signal whose potential changes with a change amount per unit time greater than that of the first reference signal, an analog-to-digital conversion unit including a comparison circuit configured to compare a potential of an input signal with a potential output from the reference signal supply unit and output a comparison result signal, and performing analog-to-digital conversion of an input signal based on the comparison result signal, and a selection circuit configured to select one of the first reference signal and the second reference signal to input the selected signal to the comparison circuit. In a first driving mode in which a correction value of signals converted based on the first reference signal and the second reference signal is acquired, the analog-to-digital conversion unit generates a first digital signal based on a comparison result signal output by comparing a first analog signal with the first reference signal by the comparison circuit, and generates a second digital signal based on a comparison result signal output by comparing the first analog signal with the second reference signal by the comparison circuit, and the correction value is acquired based on the first digital signal and the second digital signal. In a second driving mode in which a pixel signal based on an output from the pixel is read out, the comparison circuit compares a potential of the pixel signal with a potential of a threshold signal, the selection circuit selects the first reference signal when the potential of the pixel signal is less than the potential of the threshold signal, and selects the second reference signal when the potential of the pixel signal is equal to or greater than the potential of the threshold signal, and the analog-to-digital conversion unit performs analog-to-digital conversion of the pixel signal using the selected first reference signal or second reference signal. In a third driving mode in which at least one of the first analog signal and the threshold signal is controlled, based on a comparison result signal output by comparing the first analog signal with the threshold signal by the comparison circuit, at least one of the first analog signal and the threshold signal is controlled to reduce a difference between a potential of the first analog signal and a potential of the threshold signal.

According to another aspect of the present disclosure, there is provided a photoelectric conversion device including a pixel configured to output a signal corresponding to an amount of received light, an amplifying unit configured to amplify an input signal at a first gain or a second gain less than the first gain, a reference signal supply unit configured to output a reference signal whose potential changes depending on time, and an analog-to-digital conversion unit including a comparison circuit configured to compare a potential of a signal output from the amplifying unit with a potential of the reference signal and output a comparison result signal, and performing analog-to-digital conversion of an input signal based on the comparison result signal. In a first driving mode in which a correction value of signals amplified at the first gain and the second gain is acquired, the analog-to-digital conversion unit generates a first digital signal based on a comparison result signal output by comparing a signal acquired by amplifying the first analog signal at the first gain with the reference signal by the comparison circuit, and generates a second digital signal based on a comparison result signal output by comparing a signal acquired by amplifying the first analog signal at the second gain with the reference signal by the comparison circuit, and the correction value is acquired based on the first digital signal and the second digital signal. In a second driving mode in which a pixel signal based on an output from the pixel is read out, the comparison circuit compares a potential of the pixel signal with a potential of a threshold signal, in the amplifying unit, the first gain is set when the potential of the pixel signal is less than the potential of the threshold signal, and the second gain is set when the potential of the pixel signal is equal to or greater than the potential of the threshold signal, and the analog-to-digital conversion unit performs analog-to-digital conversion of the pixel signal amplified at the set first gain or second gain. In a third driving mode in which at least one of the first analog signal and the threshold signal is controlled, based on a comparison result signal output by comparing a signal acquired by amplifying the first analog signal at the first gain with the threshold signal by the comparison circuit, at least one of the first analog signal and the threshold signal is controlled to reduce a difference between a potential of the signal acquired by amplifying the first analog signal at the first gain and a potential of the threshold signal.

Further features of the present invention will become apparent from the following description of exemplary embodiments with reference to the attached drawings.

DESCRIPTION OF THE EMBODIMENTS

Figure 1:
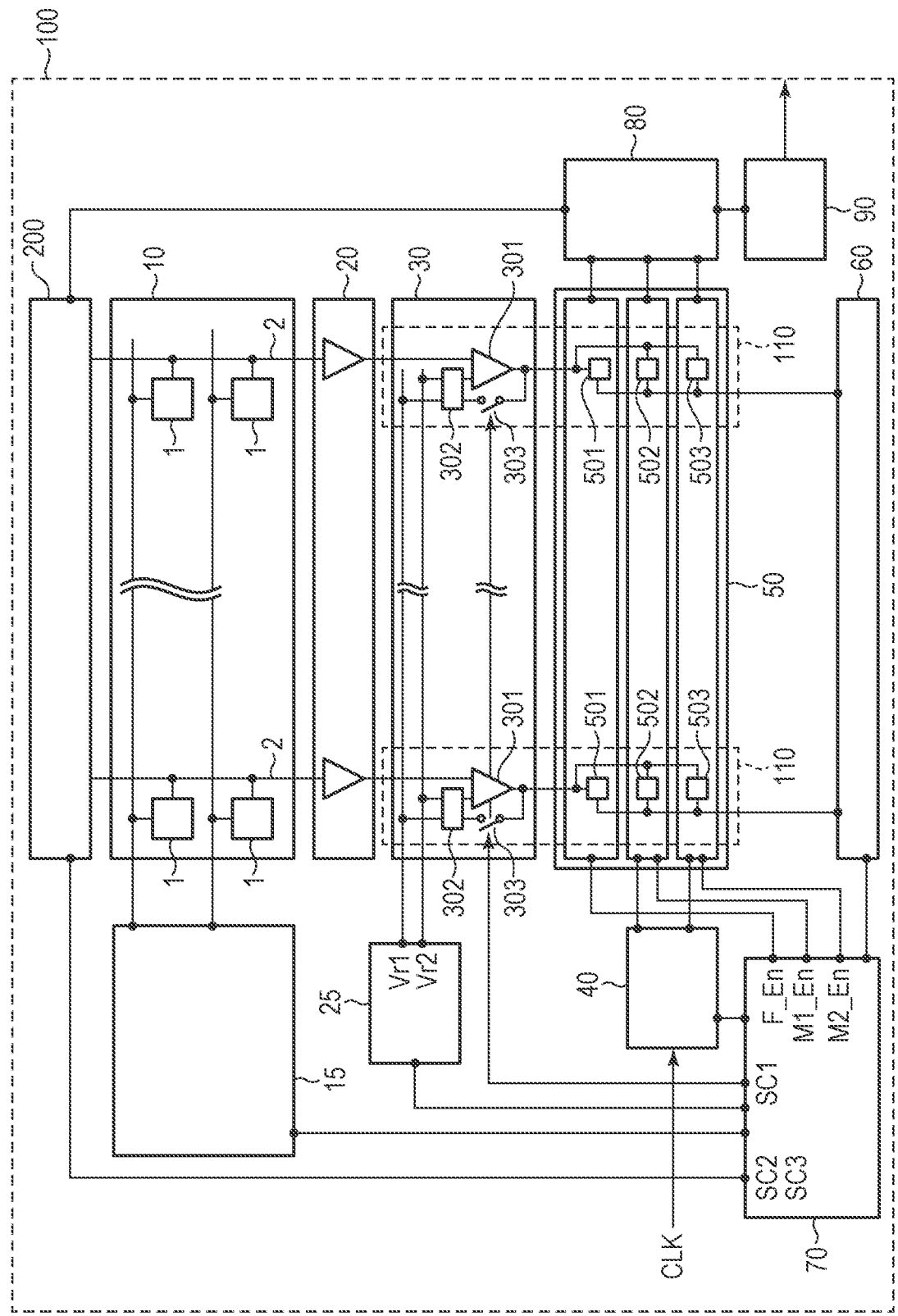
FIG. 1 is a diagram illustrating a configuration example of a photoelectric conversion device according to a first embodiment.

Preferred embodiments of the present invention will now be described in detail in accordance with the accompanying drawings. In the drawings, the same or corresponding elements are denoted by the same reference numerals, and the description thereof may be omitted or simplified. In the following embodiments, an imaging device will be mainly described as an example of a photoelectric conversion device. However, the photoelectric conversion device in each embodiment is not limited to the imaging device, and can be applied to other devices. Examples of other devices include a distance measuring device and a photometric device. The distance measuring device may be, for example, a focus detection device, a distance measuring device using a time-of-flight (TOF), or the like. The photometric device may be a device that measures an amount of light incident on the device.

First Embodiment

FIG. 1 is a schematic block diagram of a photoelectric conversion device 100 according to the present embodiment. It is assumed that the photoelectric conversion device 100 illustrated in FIG. 1 is an imaging device that acquires an image. Although the photoelectric conversion device 100 illustrated in FIG. 1 is formed on the same semiconductor substrate, elements constituting the photoelectric conversion device 100 may be formed separately in a plurality of semiconductor substrates.

The photoelectric conversion device 100 includes a pixel unit 10, a vertical scanning circuit 15, an amplifying unit 20, a reference signal supply unit 25, a comparison unit 30, a counter 40, a memory unit 50, and a horizontal scanning circuit 60. The photoelectric conversion device 100 includes a timing generator (TG) 70, a digital signal processor (DSP) 80, an output circuit 90, and a test signal supply unit 200.

The pixel unit 10 includes a plurality of pixels 1 arranged in a plurality of rows and a plurality of columns. Each of the pixels 1 outputs a signal to the amplifying unit 20 via the column signal line 2 in response to a scanning of control signals output from the vertical scanning circuit 15. The pixel 1 has a photoelectric conversion unit that photoelectrically converts incident light. The pixel 1 outputs a signal corresponding to an amount of received light. The pixel signal based on the output from the pixel 1 includes a reset signal based on the reset state of the pixel 1 and a photoelectric conversion signal based on charges acquired by photoelectrically converting incident light.

The vertical scanning circuit 15 supplies control signals for controlling the transistors included in the pixel 1 to be turned on (conducting state) or off (non-conducting state) via control signal lines provided in each row of the pixel unit 10 based on a signal output from the TG 70. The vertical scanning circuit 15 may be configured by a logic circuit such as a shift register or an address decoder.

The amplifying unit 20 is provided in an electrical path between the comparison unit 30 and the pixel 1. The amplifying unit 20 may include a column amplifying unit provided corresponding to each column of the pixel unit 10. The amplifying unit 20 amplifies the signal output from the pixel 1 in each column and outputs an amplified signal to the comparison unit 30.

The comparison unit 30 includes a comparison circuit 301, a selection circuit 302, and a switch 303 which are provided corresponding to each column of the pixel unit 10. The reference signal supply unit 25 outputs a plurality of reference signals Vr1 and Vr2 to the selection circuit 302 of each column under the control of the TG 70. The comparison circuit 301 receives an output signal of the amplifying unit 20 and an output signal of the selection circuit 302. The switch 303 is connected between an output terminal of the comparison circuit 301 and a selection signal input terminal of the selection circuit 302. The switch 303 is controlled to be turned on or off based on a control signal SC1 output from the TG 70. The comparison circuit 301 outputs a selection signal SEL to the selection circuit 302 via the switch 303 based on a comparison result signal CMP indicating a result of comparison between the output signal of the amplifying unit 20 and a threshold signal. The selection circuit 302 selects a reference signal to be output to the comparison circuit 301 from the plurality of reference signals Vr1 and Vr2 based on the selection signal SEL. The threshold signal is a signal corresponding to the potential of the reference signal Vr1 in a predetermined period.

The comparison circuit 301 outputs a comparison result signal CMP indicating a result of comparing the signal output from the amplifying unit 20 with the reference signal Vr1 or the reference signal Vr2 to the memory unit 50. The memory unit 50 includes a flag memory 501, a first memory 502, and a second memory 503 which are provided corresponding to each column of the pixel unit 10. The TG 70 outputs a control signal F_En to the flag memory 501, a control signal M1_En to the first memory 502, and a control signal M2_En to the second memory 503. These control signals are commonly input to memories in each column. The counter 40 outputs a count signal acquired by counting a clock signal CLK input from the outside to the first memory 502 and the second memory 503 under the control of the TG 70.

The first memory 502 and the second memory 503 hold a count signal indicating a time from when a potential of the reference signal Vr1 or the reference signal Vr2 starts to change until the magnitude relation with a potential of the output signal of the amplifying unit 20 changes. Thus, the first memory 502 and the second memory 503 hold a signal acquired by converting the output signal of the amplifying unit 20 into a digital signal. An analog-to-digital conversion unit (AD conversion unit) 110 includes the comparison circuit 301, the selection circuit 302, the switch 303, the flag memory 501, the first memory 502, and the second memory 503. The AD conversion unit 110 performs analog-to-digital conversion (AD conversion) on the output signal of the amplifying unit 20 to hold the generated digital signal. The AD conversion unit 110 is provided corresponding to each column of the pixel unit 10.

The horizontal scanning circuit 60 performs horizontal transfer in which digital signals held in the flag memory 501, the first memory 502, and the second memory 503 of each column are sequentially output to the DSP 80 under the control of the TG 70. The horizontal scanning circuit 60 may be configured by a logic circuit such as a shift register or an address decoder.

The DSP 80 processes the signals output from the flag memory 501, the first memory 502, and the second memory 503, and outputs the processed signals to the output circuit 90. The output circuit 90 outputs a signal to the outside of the photoelectric conversion device 100 under the control of the TG 70.

Control signals SC2 and SC3 output from the TG 70 and control signals from the DSP 80 are input to the test signal supply unit 200. The test signal supply unit 200 outputs test signals VS1 and VS2 to the column signal lines 2 based on these control signals.

Figure 2:
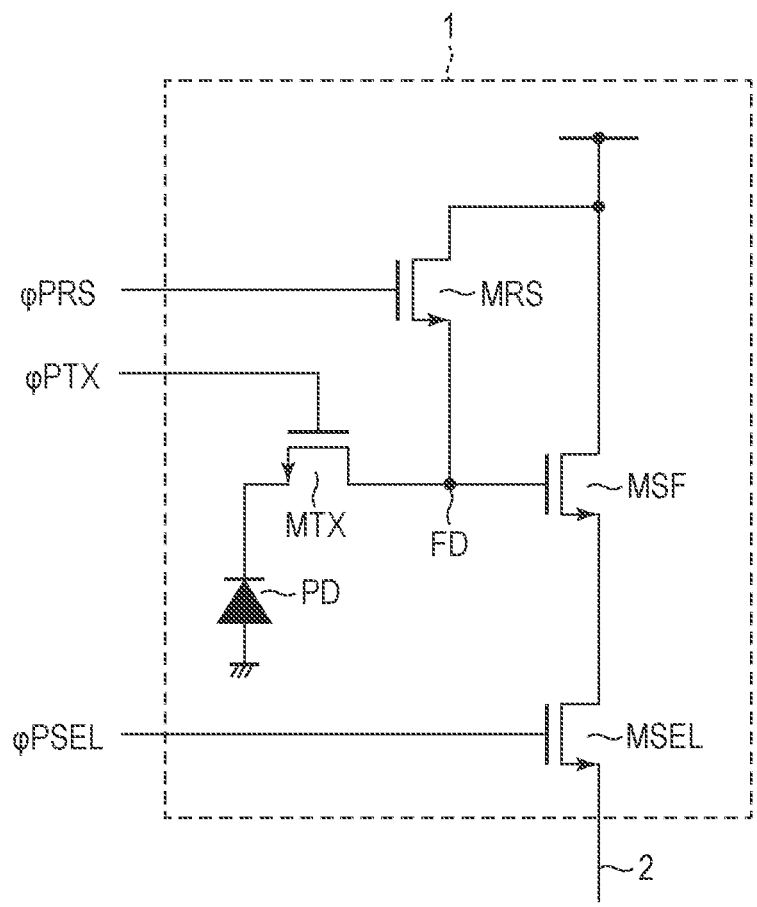
FIG. 2 is a circuit diagram of a pixel according to the first embodiment.

FIG. 2 is a circuit diagram of the pixel 1 according to the first embodiment. The pixel 1 includes a photoelectric conversion unit PD, a transfer transistor MTX, a reset transistor MRS, an amplifying transistor MSF, and a selection transistor MSEL. These transistors are configured by NMOS transistors having gates as control electrodes. Control signals φPTX, φPRS, and φPSEL for controlling the transfer transistor MTX, the reset transistor MRS, and the selection transistor MSEL are input to gates of those transistors from the vertical scanning circuit 15 via control signal lines, respectively. When these control signals are at the H level (high level), the corresponding transistors are at the on state, and when these control signals are at the L level (low level), the corresponding transistors are at the off state. Note that these transistors may be PMOS transistors, and in this case, the notation of a source and a drain, the relation between the levels of the control signal and the on/off state, and the like can be changed as appropriate.

The photoelectric conversion unit PD is a photoelectric conversion element that generates electric charges corresponding to incident light by photoelectric conversion and accumulates the electric charges. The photoelectric conversion unit PD may be configured by a photodiode formed in a semiconductor substrate. The anode of the photodiode constituting the photoelectric conversion unit PD is connected to a ground wiring to which a ground potential is supplied. The cathode of the photodiode constituting the photoelectric conversion unit PD is connected to the source of the transfer transistor MTX.

The drain of the transfer transistor MTX, the source of the reset transistor MRS, and the gate of the amplifying transistor MSF are connected to a floating diffusion FD. The transfer transistor MTX is turned on to transfer the charges of the photoelectric conversion unit PD to the floating diffusion FD. Due to the capacitance of the floating diffusion FD, a potential of the floating diffusion FD changes according to the charges transferred from the photoelectric conversion unit PD.

The drain of the reset transistor MRS and the drain of the amplifying transistor MSF are connected to a power supply wiring having a power supply potential. The source of the amplifying transistor MSF is connected to the drain of the selection transistor MSEL. The source of the selection transistor MSEL is connected to the column signal line 2. The amplifying transistor MSF forms a source follower circuit together with a current source (not illustrated) connected to the column signal line 2. The source follower circuit outputs a signal based on the potential of the floating diffusion FD to the column signal line 2 via the selection transistor MSEL. The reset transistor MRS is turned on to reset the potential of the floating diffusion FD.

The pixel 1 has a microlens and a color filter arranged on the optical path until the incident light is guided to the photoelectric conversion unit PD. The microlens focuses incident light on the photoelectric conversion unit PD. The color filter selectively transmits light of a predetermined color.

Figure 3:
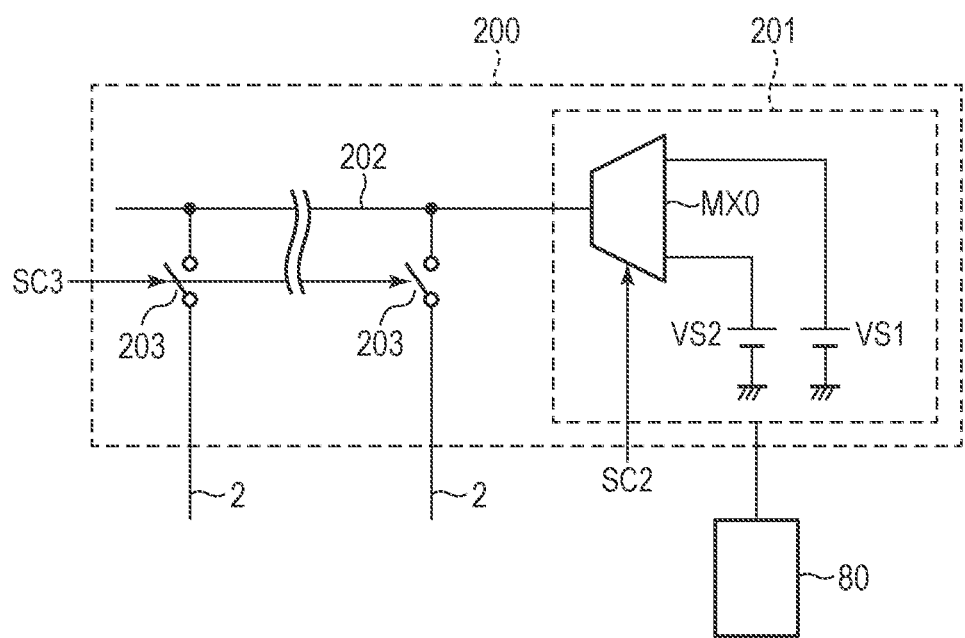
FIG. 3 is a circuit diagram of a test signal supply unit according to the first embodiment.

FIG. 3 is a circuit diagram illustrating an example of the configuration of the test signal supply unit 200. The test signal supply unit 200 (analog signal supply unit) includes a test signal selection unit 201, a test signal supply line 202, and a plurality of switches 203. The test signal selection unit 201 includes a multiplexer MX0. Test signals VS1 and VS2 of different potentials are input to two input terminals of the multiplexer MX0, respectively. The control signal SC2 output from the TG 70 is input to a control terminal of the multiplexer MX0. An output terminal of the multiplexer MX0 is connected to the test signal supply line 202. Either the test signal VS1 or the test signal VS2 is output to the test signal supply line 202 based on the level of the control signal SC2.

In the present embodiment, the potential of the test signal VS1 corresponds to the potential of the reset signal of the pixel 1. In the present embodiment, the potential of the test signal VS2 is equal to or less than the peak potential of the reference signal Vr1. The potential of the test signal VS2 is controlled in response to a control signal from the DSP 80.

The plurality of switches 203 are arranged corresponding to the plurality of column signal lines 2. First terminals of the plurality of switches 203 are connected to the test signal supply line 202. The second terminal of each of the plurality of switches 203 is connected to the column signal line 2 of the corresponding column. The control signal SC3 output from the TG 70 is input to the control terminals of the plurality of switches 203. The plurality of switches 203 are at the on state when the control signal SC3 is at the H level, and at the off state when the control signal SC3 is at the L level. When the plurality of switches 203 are turned on, a potential based on either the test signal VS1 or the test signal VS2 is output to the column signal lines 2.

Figure 4:
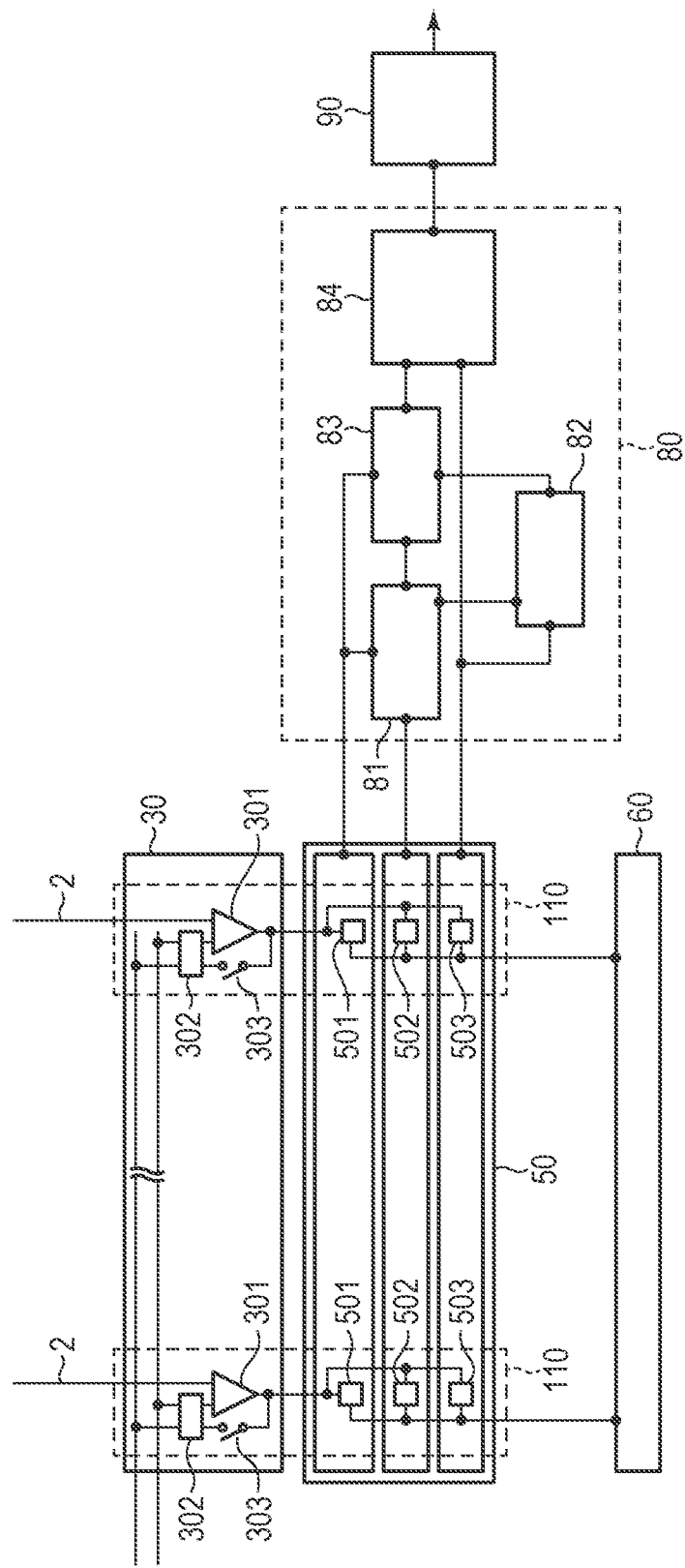
FIG. 4 is a diagram illustrating a configuration of a digital signal processor according to the first embodiment.

FIG. 4 is a diagram illustrating a configuration of the DSP 80 according to the present embodiment. Since the configuration of the portions other than the DSP 80 is the same as that in FIG. 1, the description thereof will be omitted. The DSP 80 includes a level shift unit 81, a correction value acquisition unit 82, a correction calculation unit 83, and a difference acquisition unit 84. When the signal value held in the flag memory 501 is at the L level, the level shift unit 81 shifts each bit of the signal held in the first memory 502 upward by two bits. When performing a correction operation illustrated in FIG. 8, the level shift unit 81 outputs a signal to the correction value acquisition unit 82. The correction value acquisition unit 82 acquires a signal held in the second memory 503. The correction value acquisition unit 82 generates a correction value based on these signals and outputs the correction value to the correction calculation unit 83. The correction calculation unit 83 corrects the signal output from the level shift unit 81, and outputs the corrected signal to the difference acquisition unit 84. The difference acquisition unit 84 acquires a difference between the signal output from the correction calculation unit 83 and the signal output from the second memory 503, and outputs the difference to the output circuit 90. The DSP 80 is a correction unit in the present embodiment.

Figure 5:
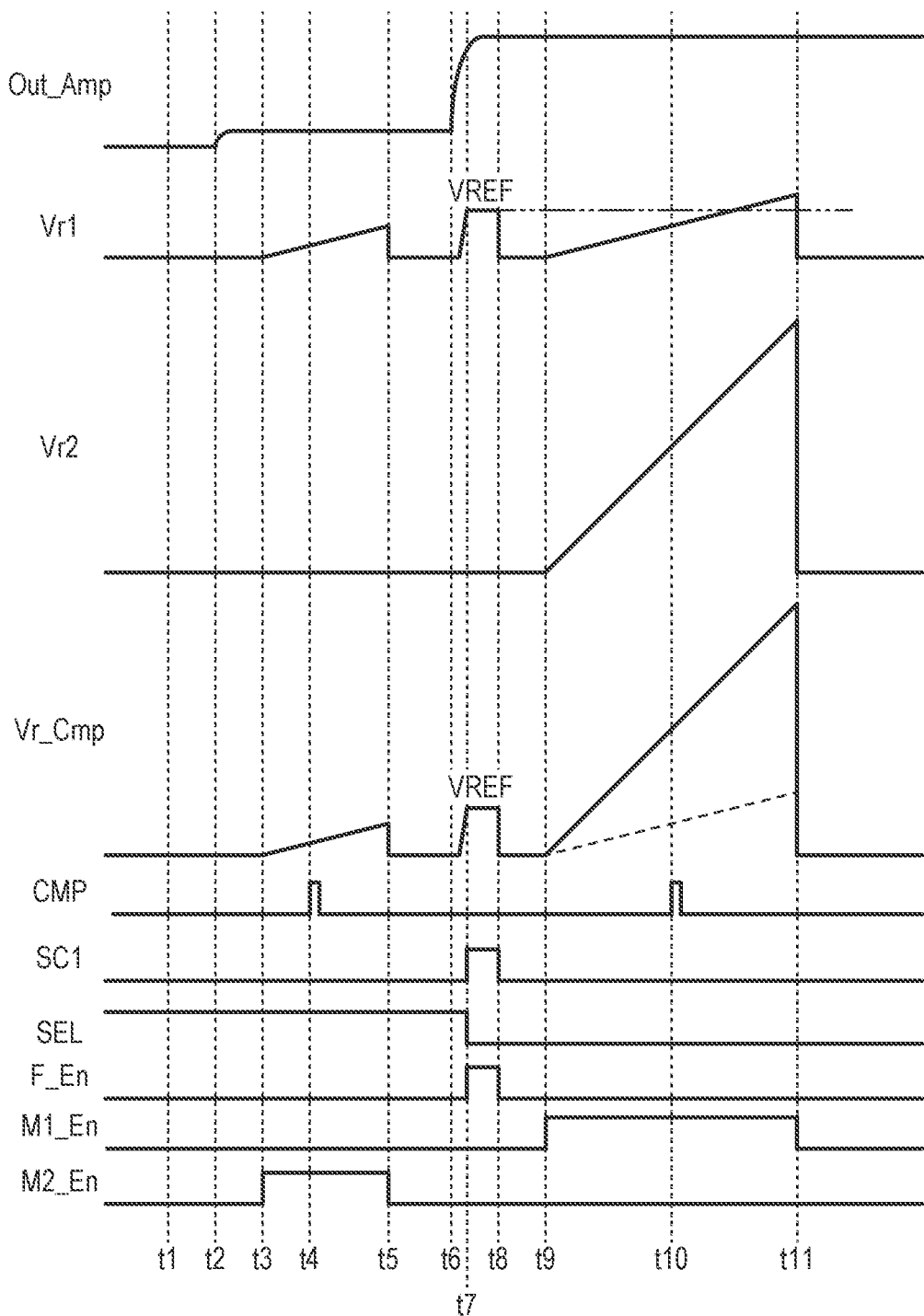
FIG. 5 is a timing chart illustrating an operation of the photoelectric conversion device according to the first embodiment.

FIG. 5 is a timing chart illustrating an operation of the photoelectric conversion device 100 according to the present embodiment. The operation of the photoelectric conversion device 100 will be described with reference to FIG. 5.

"Out_Amp" illustrated in FIG. 5 indicates the potential of the output signal of the amplifying unit 20. "Vr1" and "Vr2" illustrated in FIG. 5 indicate the potentials of the reference signals Vr1 and Vr2 output from the reference signal supply unit 25, respectively. As illustrated in FIG. 5, the slope of the potential of the reference signal Vr2 is greater than the slope of the potential of the reference signal Vr1. That is, the reference signal Vr1 is a first reference signal whose potential changes with a first change amount per unit time. The reference signal Vr2 is a second reference signal whose potential changes with a second change amount greater than the first change amount per unit time.

"Vr_Cmp" illustrated in FIG. 5 indicates a potential of a reference signal Vr_Cmp that the selection circuit 302 selects one of the reference signals Vr1 and Vr2 and outputs to the comparison circuit 301. "CMP" illustrate in FIG. 5 represents the potential of the comparison result signal CMP indicating the result of comparison of the potential of the output signal Out_Amp of the amplifying unit 20 with the potential of the reference signal Vr_Cmp by the comparison circuit 301. When the potential of the reference signal Vr_Cmp becomes greater than the potential of the output signal Out_Amp of the amplifying unit 20 and the magnitude relation is changed, the comparison result signal CMP temporarily becomes the H level. The control signal SC1 illustrated in FIG. 5 is a signal for controlling conduction of the switch 303, and the switch 303 is turned on when the control signal SC1 is at the H level.

FIG. 5 illustrates control signals F_En, M1_En, and M2_En. When the control signal F_En becomes the H level, the flag memory 501 holds the comparison result signal CMP. The control signals M1_En and M2_En are signals for enabling the holding operation of the count signal by the first memory 502 and the second memory 503, respectively. The first memory 502 holds the count signal when the control signal M1_En is at the H level and the signal value of the comparison result signal CMP is changed. The second memory 503 holds the count signal when the control signal M2_En is at the H level and the signal value of the comparison result signal CMP is changed.

At time t1, the comparison result signal CMP and the control signals SC1, F_En, M1_En, and M2_En are at the L level. The selection signal SEL is at the H level.

At time t2, a reset signal is output from the pixel 1. The amplifying unit 20 outputs a signal acquired by amplifying the reset signal. Thus, the potential of the output signal Out_Amp of the amplifying unit 20 changes.

At time t3, the reference signal supply unit 25 starts changing the potential of the reference signal Vr1 depending on time. When the selection signal SEL is at the H level, the selection circuit 302 selects the reference signal Vr1 from the input reference signals Vr1 and Vr2 and outputs the selected reference signal Vr1 to the comparison circuit 301. In addition, at time t3, the control signal M2_En becomes the H level.

At time t4, the magnitude relation between the output signal Out_Amp of the amplifying unit 20 and the reference signal Vr_Cmp is changed, and the signal value of the comparison result signal CMP changes. Since the control signal M1_En is at the L level and the control signal M2_En is at the H level, the second memory 503 holds the count signal at this time.

At time t5, the reference signal supply unit 25 stops changing the potential of the reference signal Vr1 depending on time, and sets the potential of the reference signal Vr1 to the potential at time t3. The TG 70 sets the control signal M2_En to the L level.

At time t6, the pixel 1 outputs a photoelectric conversion signal. The amplifying unit 20 outputs a signal acquired by amplifying the photoelectric conversion signal to the comparison circuit 301. Thus, the potential of the output signal Out_Amp of the amplifying unit 20 changes.

At time t7, the reference signal supply unit 25 increases the potential of the reference signal Vr1 to a potential of a threshold signal VREF. The potential of the threshold signal VREF is a predetermined potential equal to or less than the peak potential of the reference signal Vr1 at later-described time t11. When the potential of the output signal of the amplifying unit 20 is equal to or greater than the potential of the threshold signal VREF, the comparison circuit 301 outputs the comparison result signal CMP of the L level. Conversely, when the potential of the output signal of the amplifying unit 20 is less than the potential of the threshold signal VREF, the comparison circuit 301 outputs the comparison result signal CMP of the H level. Here, it is assumed that the potential of the output signal of the amplifying unit 20 is less than the potential of the threshold signal VREF, and the comparison result signal CMP is at the L level.

In addition, at time t7, the control signal SC1 output from the TG 70 becomes the H level. Thus, the comparison result signal CMP of the L level is output from the comparison circuit 301 to the selection circuit 302 as the selection signal SEL. The selection circuit 302 selects the reference signal to be output to the comparison circuit 301 after time t9 based on the signal value of the selection signal SEL at time t7.

The relationship between the operation of the selection circuit 302 from time t7 to time t9 and the signal value of the selection signal SEL will be described. Even if the selection signal SEL becomes the L level at time t7, the selection circuit 302 continues to output the reference signal Vr1 to the comparison circuit 301 during a period from time t7 to time t9. Based on the signal value of the selection signal SEL, the selection circuit 302 selects a reference signal to be output after time t9 from the reference signals Vr1 and Vr2.

In addition, at time t7, the TG 70 sets the control signal F_En to the H level. Thus, the flag memory 501 holds the comparison result signal CMP at time t7, that is, the comparison result signal CMP of the L level.

At time t8, the reference signal supply unit 25 reduces the potential of the reference signal Vr1 to the potential at time t3. The TG 70 sets the control signal F_En to the L level.

At time t9, the reference signal supply unit 25 starts changing the potentials of the reference signals Vr1 and Vr2 depending on time. The selection circuit 302 selects the reference signal Vr2 from the input reference signals Vr1 and Vr2 based on the L level selection signal SEL, and outputs the selected reference signal Vr2 to the comparison circuit 301. The TG 70 sets the control signal M1_En to the H level.

At time t10, the magnitude relation between the output signal Out_Amp of the amplifying unit 20 and the reference signal Vr_Cmp is reversed, and the signal value of the comparison result signal CMP changes. Since the control signal M1_En is at the H level and the control signal M2_En is at the L level, the first memory 502 holds the count signal at this time.

At time t11, the reference signal supply unit 25 stops changing the potentials of the reference signals Vr1 and Vr2 depending on time, and sets the potential of the reference signal Vr1 to the potential at time t3. The TG 70 sets the control signal M1_En to the L level.

After the time t11, the horizontal scanning circuit 60 sequentially scans the memory unit 50 column basis, and outputs digital signals held in the flag memories 501, the first memories 502, and the second memories 503 of the respective columns to the DSP 80.

Figure 6:
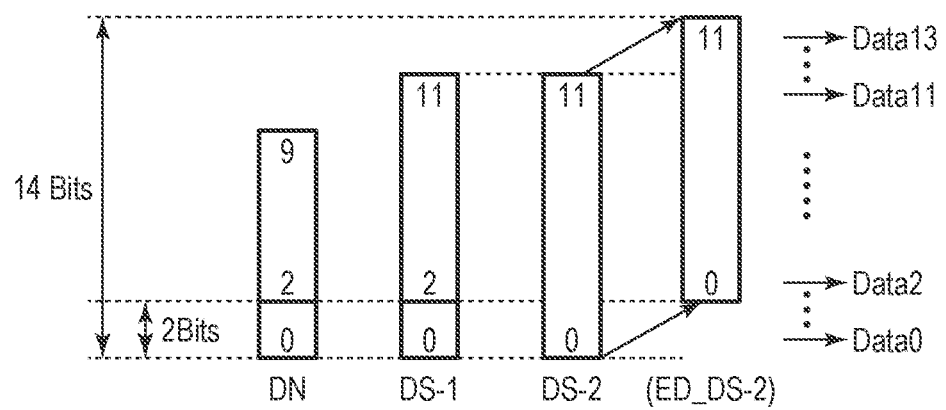
FIG. 6 is a diagram illustrating a level shift operation according to the first embodiment.

FIG. 6 is a diagram illustrating a level shift operation according to the present embodiment. The operation of the level shift unit 81 of the DSP 80 will be described with reference to FIG. 6. "DN" in FIG. 6 schematically illustrates a digital signal held in the second memory 503. "DS-1" in FIG. 6 schematically illustrates a digital signal acquired by comparing the reference signal Vr1 with the output signal of the amplifying unit 20 and held in the first memory 502. "DS-2" in FIG. 6 is a digital signal acquired by comparing the reference signal Vr2 with the output signal of the amplifying unit 20 and held by the first memory 502 in a different column from the first memory 502 in which the digital signal of "DS-1" is held. Further, "Data0" to "Data13" indicate values of respective bits constituting the digital signal.

As illustrated in FIG. 6, the digital signal held in the second memory 503 is 10 bits, and the digital signal held in the first memory 502 is 12 bits. FIG. 6 illustrates an example in which the change amount of the potential per unit time of the reference signal Vr2 is four times the change amount of the potential per unit time of the reference signal Vr1. In this case, it is necessary to set the value of the digital signal DS-2 to four times the value of the digital signal DS-1 in order to correct the difference in conversion rate at the time of AD conversion. Since $\log_2 4=2$, an operation of multiplying a binary number by four is equivalent to shifting the value of each bit up by two bits. Accordingly, the level shift unit 81 generates a digital signal ED_DS-2 by shifting each bit of the digital signal DS-2 by two bits up. FIG. 6 illustrates the digital signal ED_DS-2 acquired by level shift.

The difference acquisition unit 84 subtracts the digital signal DN from the digital signal DS-1. Then, the difference acquisition unit 84 sets the signal values Data12 and Data13 (upper two bits) to 0 and outputs them to the output circuit 90 as a 14-bit signal. Further, the difference acquisition unit 84 sets the signal values Data0 and Data1 (lower two bits) of the digital signal ED_DS-2 to 0, and then subtracts the digital signal DN. Thus, the digital signal output from the DSP 80 becomes a 14-bit signal from Data® to Data13. The history of whether the digital signal held in the first memory 502 is a digital signal acquired by using the reference signal Vr1 or by using the reference signal Vr2 can be determined based on the signal held in the flag memory 501. That is, in the operation illustrated in FIG. 5, when the signal held in the flag memory 501 is at the H level, the signal held in the first memory 502 is a signal acquired by using the reference signal Vr1. Similarly, when the signal held in the flag memory 501 is at the L level, the signal held in the first memory 502 is a signal acquired by using the reference signal Vr2.

Figure 7:
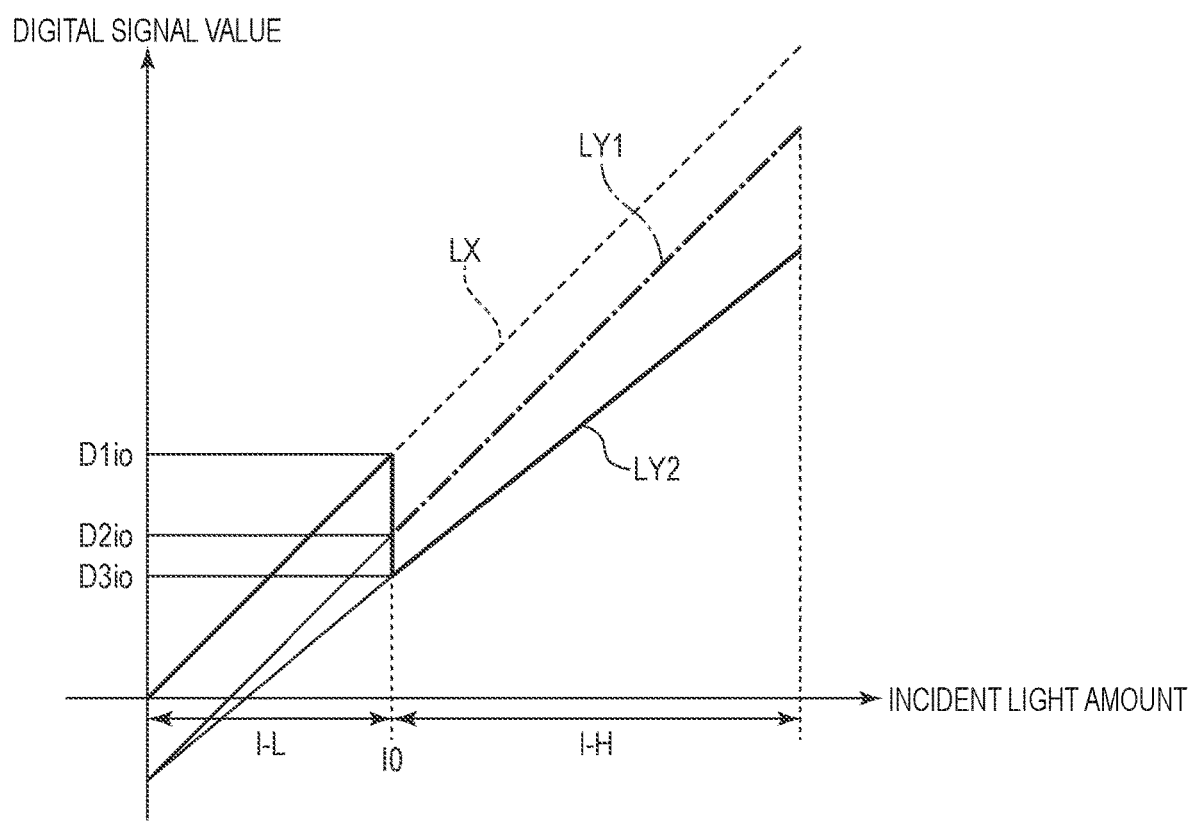
FIG. 7 is a graph illustrating a case where a correction value is not calculated.

FIG. 7 is a graph illustrating a case where a correction value is not calculated. First, signal values of digital signals acquired when the correction operation of the present embodiment is not performed will be described with reference to FIG. 7.

FIG. 7 illustrates the relationship between the incident light amount and the digital signal value output by the DSP 80 when the correction of the present embodiment, which will be described later, is not performed. The horizontal axis of FIG. 7 represents the incident light amount to the photoelectric conversion unit PD of the pixel 1, and the vertical axis of FIG. 7 represents the digital signal value output from the DSP 80. Although the digital signal values are actually discrete values, they are illustrated continuously for simplicity.

In FIG. 7, a line LX indicates a relationship between the incident light amount and the digital signal value when AD conversion is performed using the reference signal Vr1. In FIG. 7, lines LY1 and LY2 indicate the relationship between the incident light amount and the digital signal value when AD conversion is performed using the reference signal Vr2. "I-L" in FIG. 7 is a region where the reference signal Vr1 is selected as a reference signal to be compared with the output signal of the amplifying unit 20. "I-H" in FIG. 7 is a region where the reference signal Vr2 is selected as a reference signal to be compared with the output signal of the amplifying unit 20. "IO" in FIG. 7 is the boundary between "I-L" and "I-H". The graph illustrated by the solid line in FIG. 7 indicates the relationship between the incident light amount and a digital signal value generated by performing AD conversion using the reference signal Vr1 in the region I-L and using the reference signal Vr2 in the region I-H. The graph illustrated by the broken line in FIG. 7 indicates the relationship between the incident light amount and the digital signal generated by the AD conversion using the reference signal Vr1 in the region I-H.

The lines LY1 and LY2 will be described in detail. The line LY1 indicates a case where the ratio of the amount of change in the potential per unit time of the reference signal Vr2 to the amount of change in the potential per unit time of the reference signal Vr1 is just four. On the other hand, the line LY2 indicates a case where the ratio of the amount of change in the potential per unit time of the reference signal Vr2 to the amount of change in the potential per unit time of the reference signal Vr1 is less than four due to error. It is assumed that the intercepts of the lines LY1 and LY2 are displaced from the intercept of the line LX due to errors. At the boundary IO between the regions I-L and I-H, digital signal values corresponding to the lines LX and LY1 are D1*io* and D2*io*, respectively. Further, at the boundary IO, a digital signal value corresponding to the line LY2 is D3*io*. As described above, since the ratio of the change amount of the potential per unit time of the reference signal Vr2 to the change amount of the potential per unit time of the reference signal Vr1 is less than four, D3*io* is less than D2*io*. Thus, at the boundary IO, a difference (offset) in digital signal values may occur between the line LX and the line LY2. The photoelectric conversion device 100 of the present embodiment performs a correction operation to reduce this difference.

Figure 8:
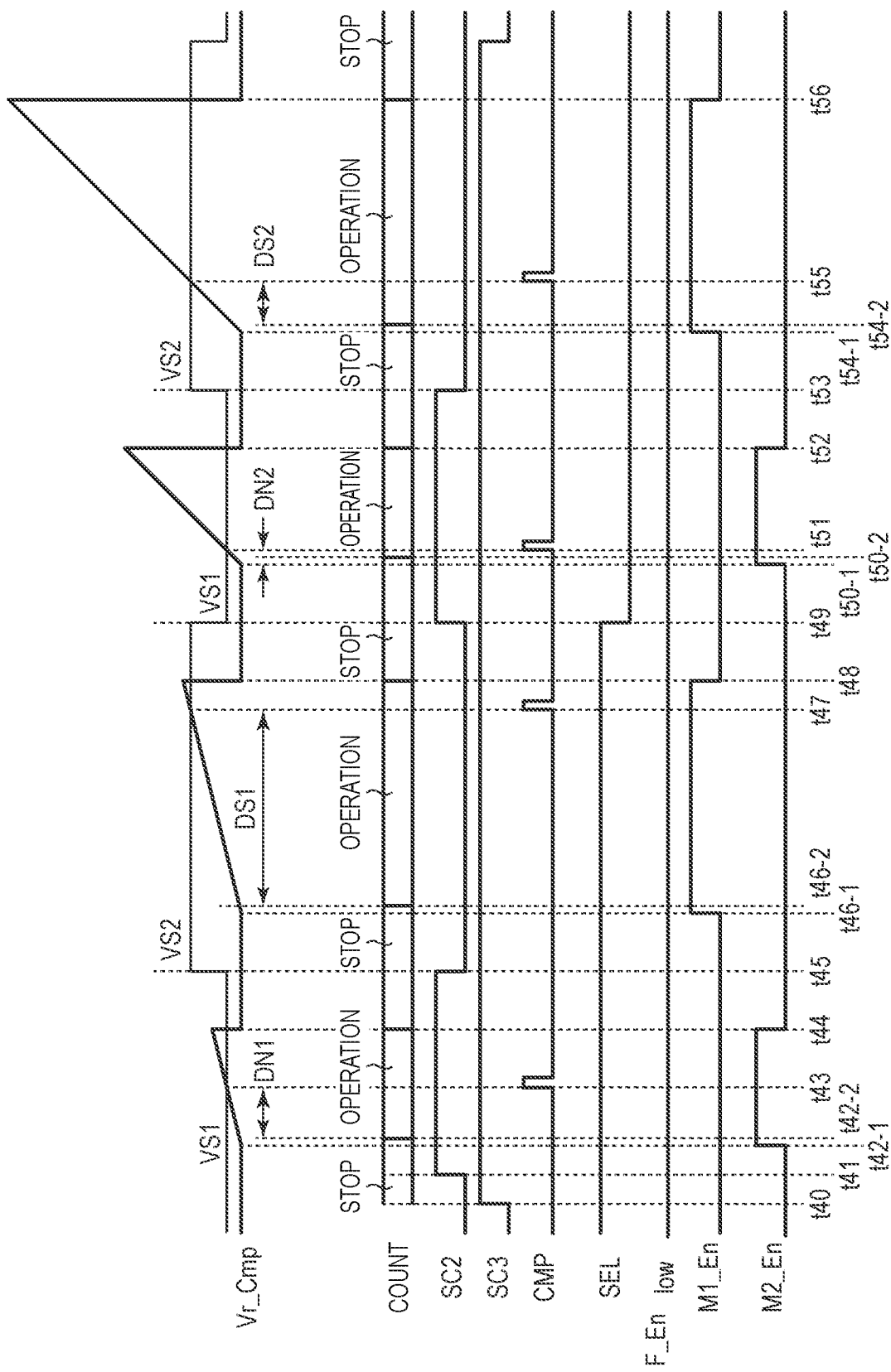
FIG. 8 is a timing chart illustrating a correction value calculating operation according to the first embodiment.

FIG. 8 is a timing chart illustrating a correction value calculating operation according to the present embodiment. The correction operation of the photoelectric conversion device 100 of the present embodiment will be described with reference to FIG. 8. The control signals SC2 and SC3 illustrated in FIG. 8 are signals for controlling the multiplexer MX0 and the plurality of switches 203 of the test signal supply unit 200. When the control signal SC2 is at the H level, the multiplexer MX0 selects and outputs the test signal VS1. When the control signal SC2 is at the L level, the multiplexer MX0 selects and outputs the test signal VS2. The switch 203 is turned on when the control signal SC3 is at the H level, and the switch 203 is turned off when the control signal SC3 is at the L level. The "operation" in the "count" in FIG. 8 indicates a period during which the counter 40 counts the clock signal CLK and outputs the count signal, and the "stop" in the "count" indicates a period during which the counter 40 does not output the count signal. Further, the reference signal Vr_Cmp in FIG. 8 is illustrated overlapping the potential corresponding to the test signal VS1 or the test signal VS2 supplied to the column signal lines 2.

At time t40, the control signal SC3 becomes the H level, and the plurality of switches 203 are turned on. Thus, the signal of the test signal supply line 202 is output to the column signal line 2 of each column. At time t40, the selection signal SEL is at the H level, and the reference signal Vr1 is input to the comparison circuit 301.

At time t41, the TG 70 sets the control signal SC2 to the H level. Thus, the test signal VS1 is output to the column signal line 2 of each column via the test signal supply line 202 and the switch 203 (second analog signal).

At time t42-1, the reference signal supply unit 25 starts changing the potential of the reference signal Vr1 depending on time. The TG 70 sets the control signal M2_En to the H level. Subsequently, at time t42-2, the counter 40 starts the counting operation of the clock signal CLK and the output of the count signal.

At time t43, the magnitude relation between the potential of the test signal VS1 and the potential of the reference signal Vr1 is changed, and the signal value of the comparison result signal CMP changes. The second memory 503 holds the count signal at this time point. Hereinafter, the count signal held in the second memory 503 at this time point is referred to as a digital signal DN1. The digital signal DN1 is a third digital signal generated by the AD conversion unit 110 based on the comparison result signal CMP output from the comparison unit 30 by comparing the first reference signal with the second analog signal.

At time t44, the reference signal supply unit 25 stops changing the potential depending on time of the reference signal Vr1. The counter 40 stops the counting operation of the clock signal CLK and the output of the count signal.

At time t45, the TG 70 sets the control signal SC2 to the L level. Thus, the test signal VS2 is output to the column signal line 2 of each column via the test signal supply line 202 and the switch 203 (first analog signal).

At time t46-1, the reference signal supply unit 25 starts changing the potential of the reference signal Vr1 depending on time. The TG 70 sets the control signal M1_En to the H level. Subsequently, at time t46-2, the counter 40 starts the counting operation of the clock signal CLK and the output of the count signal.

At time t47, the magnitude relation between the potential of the test signal VS2 and the potential of the reference signal Vr1 is changed, and the signal value of the comparison result signal CMP changes. The first memory 502 holds the count signal at this time point. Hereinafter, the count signal held in the first memory 502 at this time point is referred to as a digital signal DS1. The digital signal DS1 is a first digital signal generated by the AD conversion unit 110 based on the comparison result signal CMP output from the comparison unit 30 by comparing the first reference signal with the first analog signal having a signal value different from that of the second analog signal.

At time t48, the reference signal supply unit 25 stops changing the potential depending on time of the reference signal Vr1. During a period from time t48 to time t50, the horizontal scanning circuit 60 sequentially transfers signals held in the first memory 502 and the second memory 503 of each column to the DSP 80.

At time t49, the TG 70 sets the control signal SC2 to the H level. Thus, the test signal VS1 is output to the column signal line 2 of each column via the test signal supply line 202 and the switch 203 (second analog signal). The TG 70 sets the selection signal SEL to the L level.

At time t50-1, the reference signal supply unit 25 starts changing the potential of the reference signal Vr2 depending on time. The TG 70 sets the control signal M2_En to the H level. Subsequently, at time t50-2, the counter 40 starts the counting operation of the clock signal CLK and the output of the count signal.

At time t51, the magnitude relation between the potential of the test signal VS1 and the potential of the reference signal Vr2 is changed, and the signal value of the comparison result signal CMP changes. The second memory 503 holds the count signal at this time point. Hereinafter, the count signal held in the second memory 503 at this time point will be referred to as a digital signal DN2. The digital signal DN2 is a fourth digital signal generated by the AD conversion unit 110 based on the comparison result signal CMP output from the comparison unit 30 by comparing the second reference signal with the second analog signal.

At time t52, the reference signal supply unit 25 stops changing the potential depending on time of the reference signal Vr2. The counter 40 stops the counting operation of the clock signal CLK and the output of the count signal.

At time t53, the TG 70 sets the control signal SC2 to the L level. Thus, the test signal VS2 is output to the column signal line 2 of each column via the test signal supply line 202 and the switch 203 (first analog signal).

At time t54-1, the reference signal supply unit 25 starts changing the potential of the reference signal Vr2 depending on time. The TG 70 sets the control signal M1_En to the H level. Subsequently, at time t54-2, the counter 40 starts the counting operation of the clock signal CLK and the output of the count signal.

At time t55, the magnitude relation between the potential of the test signal VS2 and the potential of the reference signal Vr2 is changed, and the signal value of the comparison result signal CMP changes. The first memory 502 holds the count signal at this time point. Hereinafter, the count signal held in the first memory 502 at this time point is referred to as a digital signal DS2. The digital signal DS2 is a second digital signal generated by the AD conversion unit 110 based on the comparison result signal CMP output from the comparison unit 30 by comparing the second reference signal with the first analog signal.

At time t56, the reference signal supply unit 25 stops changing the potential depending on time of the reference signal Vr2. The counter 40 stops the counting operation of the clock signal CLK and the output of the count signal.

After time t56, the horizontal scanning circuit 60 sequentially transfers signals held in the first memory 502 and the second memory 503 of each column to the DSP 80.

Next, the correction operation in the present embodiment will be described. The correction value acquisition unit 82 acquires correction values $\alpha$ and $\beta$ by the following equations (1) and (2).

$$\alpha = DS1 - 4 \times \beta \times DS2 \quad (1)$$

$$(\beta = (DS1 - DN1) / \{4 \times (DS2 - DN2)\}) \quad (2)$$

The correction value acquisition unit 82 outputs the acquired correction values $\alpha$ and $\beta$ to the correction calculation unit 83. The digital signal held in the first memory 502 in a column in which the flag memory 501 is at the L level is shifted upward by two bits by the level shift unit 81, and is output to the correction calculation unit 83. The correction calculation unit 83 corrects the signal bit-shifted by the level shift unit 81 based on the following equation (3).

$$CAL\_DS = \alpha + ED\_DS \times \beta \quad (3)$$

Here, ED_DS in equation (3) is a signal acquired by the level shift unit 81 shifting the digital signal held in the first memory 502 of the column in which the flag memory 501 is at the L level upward by two bits and outputting the digital signal to the correction calculation unit 83. CAL_DS is a corrected digital signal output by the correction calculation unit 83.

On the other hand, the bit shift operation in the level shift unit 81 and the addition operation of the correction value $\alpha$ in the correction calculation unit 83 are not performed on a digital signal held in the first memory 502 in the column in which the flag memory 501 is at the H level.

Figure 9:
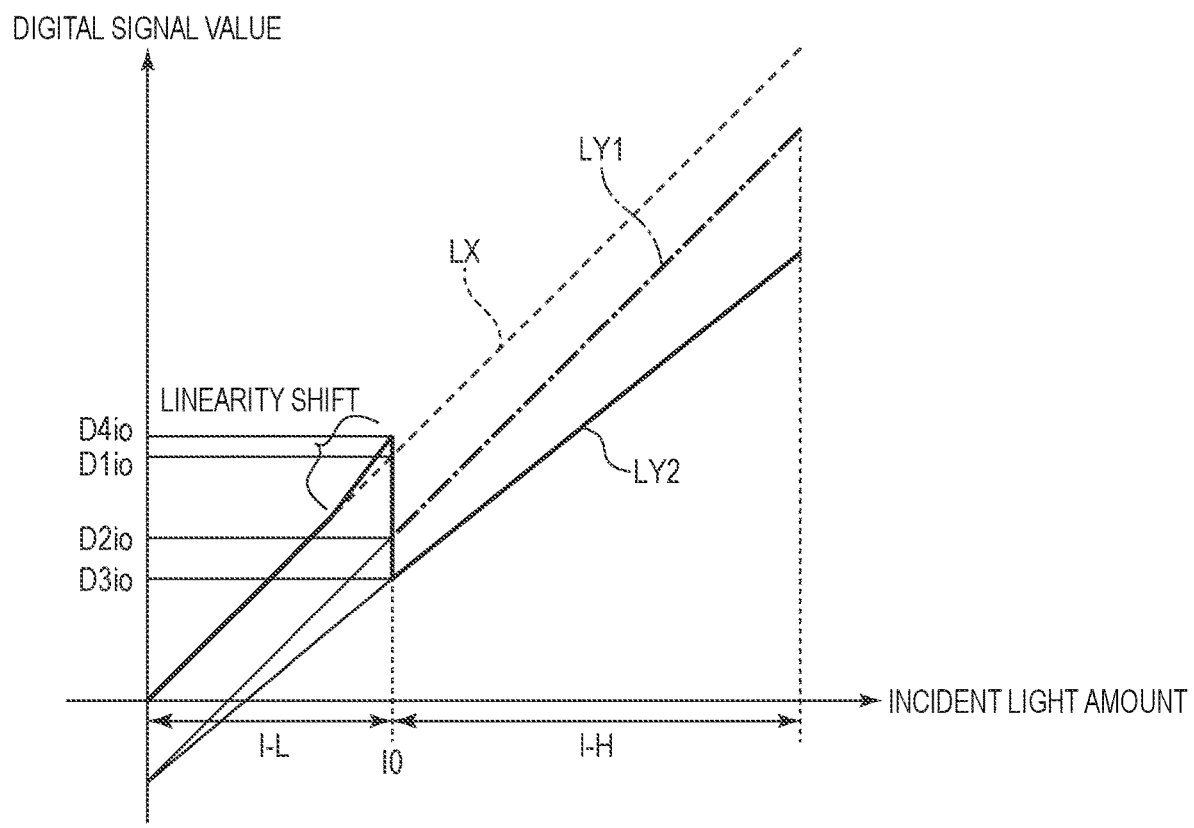
FIG. 9 is a graph illustrating a case where a correction value is not calculated.

A linearity shift may occur in the reference signal output from the reference signal supply unit 25. The potential of the reference signal is not completely linear with respect to time, and may include a non-linear portion. This may cause an error in AD conversion. FIG. 9 is a graph illustrating a case where a correction value is not calculated. A signal value of the digital signal acquired when the linearity shift occurs and the correction operation of the present embodiment is not performed will be described with reference to FIG. 9.

Similarly to FIG. 7, FIG. 9 illustrates the relationship between the incident light amount and the digital signal value output by the DSP 80. The horizontal axis of FIG. 9 represents the incident light amount to the photoelectric conversion unit PD of the pixel 1, and the vertical axis of FIG. 9 represents the signal value of the digital signal output from the DSP 80.

In FIG. 9, a line LX indicates a relationship between an incident light amount and a digital signal value when AD conversion is performed using the reference signal Vr1 with good linearity. In FIG. 9, lines LY1 and LY2 indicate the relationship between the incident light amount and the digital signal value when AD conversion is performed using the reference signal Vr2.

At the boundary IO between the regions I-L and I-H, digital signal values corresponding to the lines LX, LY1, and LY2 are D1$io$, D2$io$, and D3$io$, respectively. Since the ratio of the change amount of the potential per unit time of the reference signal Vr2 to the change amount of the potential per unit time of the reference signal Vr1 is less than four, D3$io$ is less than D2$io$.

In the example illustrated in FIG. 9, a linearity shift occurs near the boundary IO of the reference signal Vr1. Due to the linearity shift near the boundary IO, the digital signal value acquired by the reference signal Vr1 at the boundary IO is D4$io$ which is greater than D1$io$.

Next, a correction operation for reducing the offset (discontinuity) of the difference between D4$io$ and D1$io$ occurring at the boundary IO when there is a linearity shift illustrated in FIG. 9 will be described.

Figure 10:
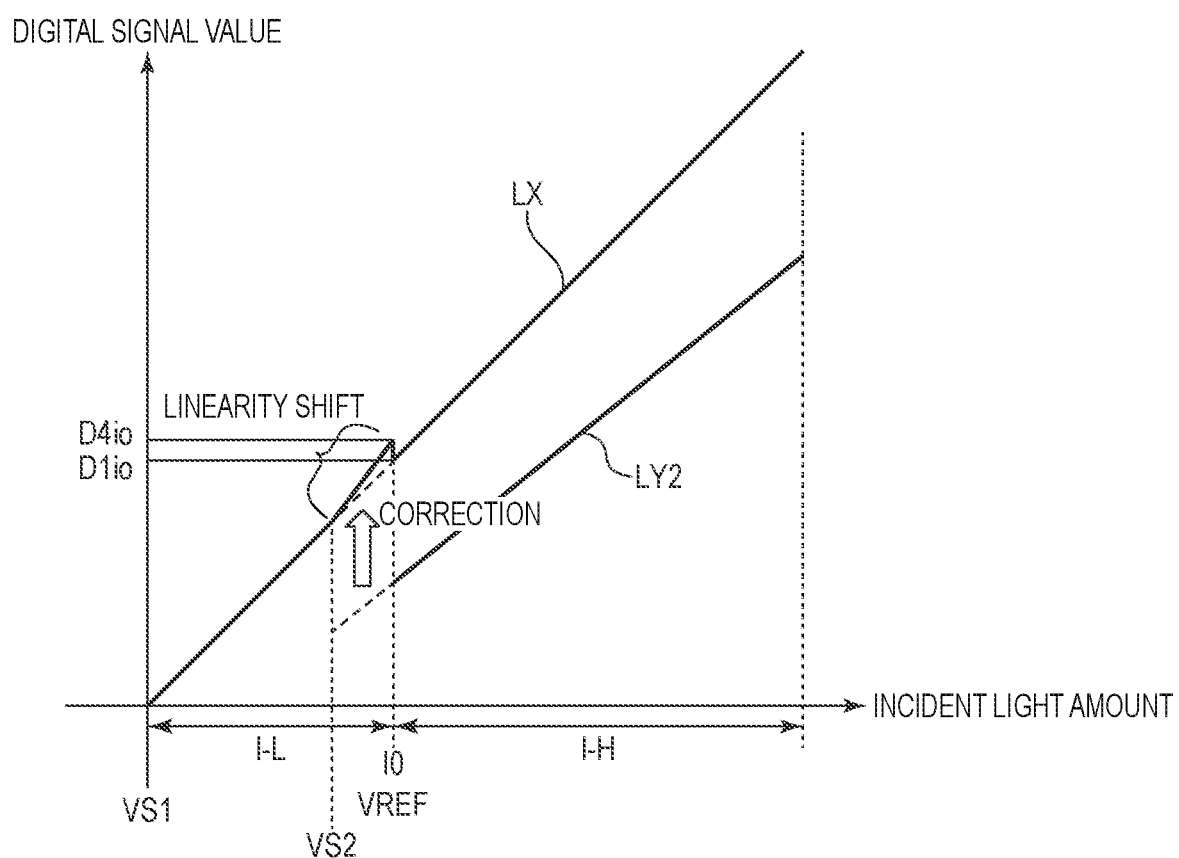
FIG. 10 is a graph illustrating an offset generated by calculating a correction value.

FIG. 10 is a graph illustrating an offset generated by calculating a correction value. First, a case where an offset occurs at the boundary IO will be described with reference to FIG. 10. Note that "VS1", "VS2", and "VREF" in FIG. 10 indicate incident light amounts corresponding to the potentials of the test signals VS1, VS2 and the threshold signal VREF, respectively.

The boundary IO is determined by the level of the threshold signal VREF as described above. This is because AD conversion is performed using the reference signal Vr2 when the potential of the output signal of the amplifying unit 20 is equal to or greater than the potential of the threshold signal VREF, and AD conversion is performed using the reference signal Vr1 when the potential of the output signal of the amplifying unit 20 is less than the potential of the threshold signal VREF.

The potential of the test signal VS1 used for acquiring the correction value of the present embodiment corresponds to the reset signal of the pixel 1. In the graph of FIG. 10, the potential of the test signal VS1 corresponds to the origin of the horizontal axis of the graph. The potential of the test signal VS2 is equal to or less than the maximum value of the reference signal Vr1, and VS2≤VREF.

FIG. 10 illustrates a case where the potential of the test signal VS2 is equal to or less than the incident light amount in which a linearity shift occurs. Since the reference signal Vr1 has good linearity in the region between the test signal VS1 and the test signal VS2, the correction is performed so as not to cause an offset at the incident light amount corresponding to the test signal VS2. However, since the reference signal Vr1 and the reference signal Vr2 at the time of reading the pixel signal are switched at the boundary IO, an offset (D4$io$–D1$io$) occurs at the boundary IO due to a linearity shift of the reference signal Vr1.

Figure 11:
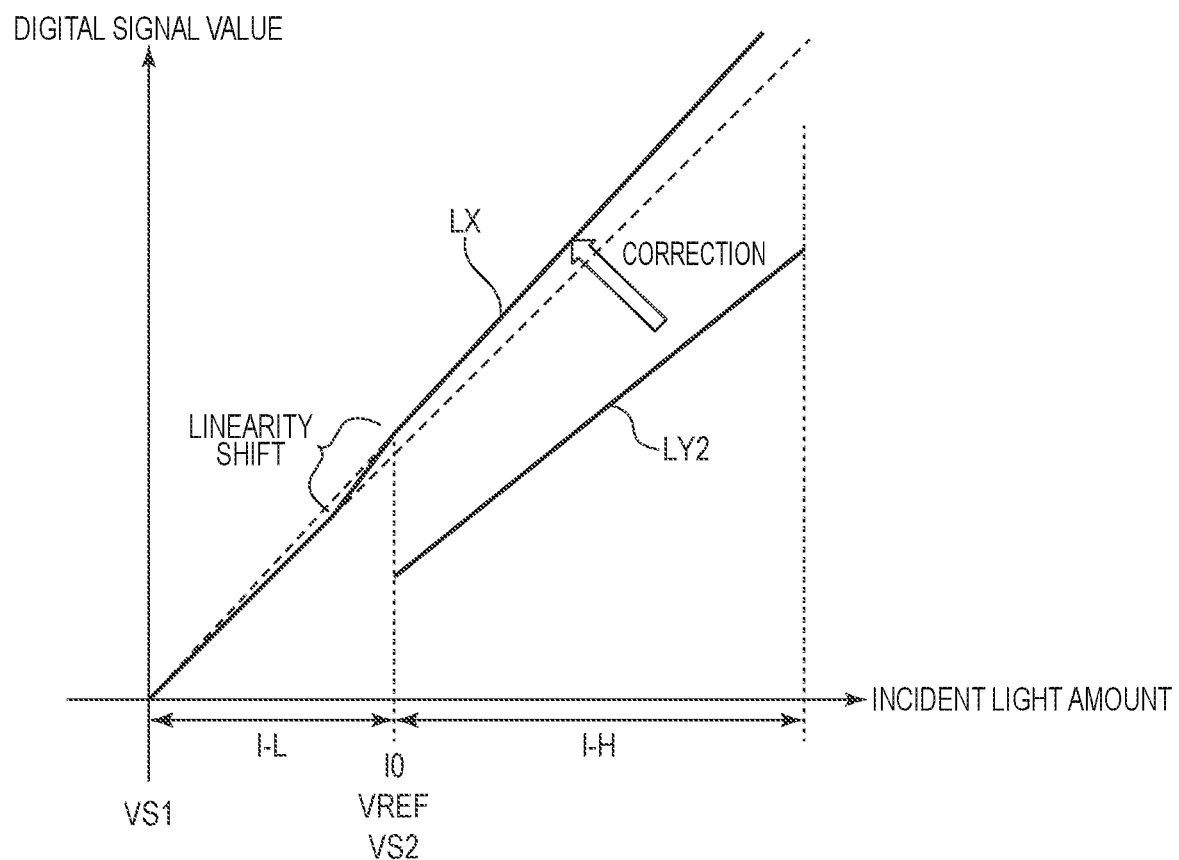
FIG. 11 is a graph illustrating a case where no offset occurs in the correction value calculation.

FIG. 11 is a graph illustrating a case where no offset occurs in the correction value calculation. A case where the potential of the test signal VS2 is equal to the potential of the threshold signal VREF will be described with reference to FIG. 11.

Even when the potential of the test signal VS2 is equal to the potential of the threshold signal VREF, as described above, the correction calculation is performed assuming that the reference signal Vr1 is linear between the test signal VS1 and the test signal VS2. That is, the correction is performed so as not to cause an offset at the incident light amount corresponding to the test signal VS2. Since the potential of the test signal VS2 is equal to the potential of the threshold signal VREF, the incident light amount corresponding to the test signal VS2 is the boundary IO. Therefore, when the potential of the test signal VS2 is equal to the potential of the threshold signal VREF, no offset occurs at the boundary IO.

In this case, the slope in the region I-H is corrected so as to deviate from the desired slope. However, compared to the case where the offset occurs at the boundary IO, the change of the digital signal value with respect to the incident light amount is gentle, so that the influence on the image quality is less likely to occur.

Thus, when the linearity of the reference signal is poor, it is desirable that the difference between the potential of the test signal VS2 and the potential of the threshold signal VREF be small. Therefore, in the present embodiment, an operation of adjusting for reducing the difference between the potential of the test signal VS2 and the potential of the threshold signal VREF (correction value calculation potential adjusting operation) is added.

Figure 12:
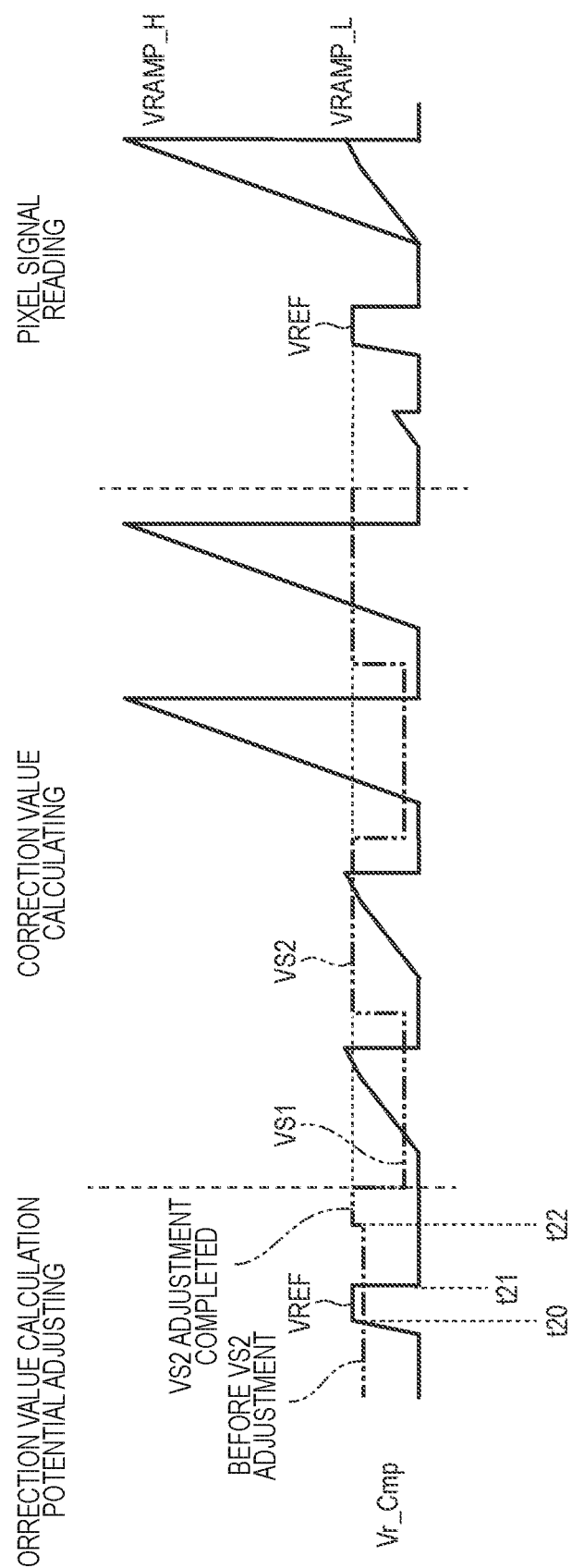
FIG. 12 is a timing chart illustrating a correction value calculation potential adjusting operation according to the first embodiment.

FIG. 12 is a timing chart illustrating a correction value calculation potential adjusting operation according to the present embodiment. The correction value calculation potential adjusting operation will be described with reference to FIG. 12. FIG. 12 schematically illustrates waveforms of the reference signal Vr_Cmp and the test signals VS1 and VS2 in the correction value calculation potential adjusting operation (third driving mode), the correction value calculating operation (first driving mode), and the pixel signal reading operation (second driving mode). The correction value calculating operation and the pixel signal reading operation are the same as those in FIGS. 8 and 5, respectively, and a description thereof will be omitted. Further, regarding the correction value calculation potential adjusting operation, the description of the already described operation will be simplified. In FIG. 12, "VRAMP_H" indicates one of two types of reference signals having larger slope (that is, reference signal Vr2), and "VRAMP_L" indicates the other of two types of reference signals having smaller slope (that is, reference signal Vr1).

The correction value calculation potential adjusting operation in FIG. 12 will be described. During a period from time t20 to time t21, the potential of the reference signal Vr_Cmp input to the comparison circuit 301 becomes the potential of the threshold signal VREF. During the period from time t20 to time t21, the test signal VS2 is output from the test signal supply unit 200 to the column signal lines 2. The comparison circuit 301 compares the potential of the test signal VS2 with the potential of the threshold signal VREF.

When the potential of the test signal VS2 is equal to or greater than the potential of the threshold signal VREF, the comparison circuit 301 outputs the comparison result signal CMP of the L level. Conversely, when the potential of the test signal VS2 is less than the potential of the threshold signal VREF, the comparison circuit 301 outputs the comparison result signal CMP of the H level. The flag memory 501 holds the comparison result signal CMP output from the comparison circuit 301. The horizontal scanning circuit 60 sequentially scans the flag memory 501 of each column, and transfers an H-level or L-level digital signal to the DSP 80.

At time t22, the DSP 80 outputs a control signal for changing the potential of the test signal VS2 to the test signal supply unit 200 based on the level of the digital signal transferred from the flag memory 501. The DSP 80 outputs a control signal for decreasing the potential of the test signal VS2 when the level of the digital signal transferred from the flag memory 501 is the L level, and outputs a control signal for increasing the potential of the test signal VS2 when the level of the digital signal is the H level. FIG. 12 illustrates an example in which the potential of the test signal VS2 is increased to approximately the same level as the potential of the threshold signal VREF.

Thus, the difference between the potential of the test signal VS2 and the potential of the threshold signal VREF can be reduced. After the above-described correction value calculation potential adjusting operation is completed, the above-described correction value calculating operation and pixel signal reading operation are performed using the adjusted test signal VS2. In this way, by performing the correction operation of the test signal VS2 by the DSP 80, as described with reference to FIGS. 10 and 11, it is possible to reduce the offset that may occur at the boundary IO.

The threshold signal VREF is generated by the reference signal supply unit 25, and the test signal VS2 is generated by supplying a potential from the test signal supply unit 200 to the column signal lines 2. As described above, since the potentials of the two signals differ from each other at the generation point and the generation method, even if the two signals are designed to have the same potential, the potentials of the two signals may be different from each other due to process variations during manufacturing or the like. In the present embodiment, the difference between the potential of the threshold signal VREF and the potential of the test signal VS2 is determined by the comparison circuit 301, and the processing of reducing the difference is performed, so that the difference between the potentials may be reduced even if there are process variations or the like.

As described above, by performing the process of reducing the difference between the potential of the test signal VS2 and the potential of the threshold signal VREF, the offset of the digital signal value occurring at the boundary IO due to the linearity shift of the reference signal can be reduced. Therefore, according to the present embodiment, it is possible to provide the photoelectric conversion device 100 capable of further reducing the correction error.

The correction value calculation potential adjusting operation and the correction value calculating operation in the present embodiment may be performed when the photoelectric conversion device 100 is powered on. The correction value calculation potential adjusting operation and the correction value calculating operation according to the present embodiment may be performed during a blanking period after the vertical scanning circuit 15 scans all the rows of the pixel unit 10 until the next scan of the pixel unit 10 is started. The correction value calculation potential adjusting operation and the correction value calculating operation according to the present embodiment may be performed when the imaging mode (signal acquisition mode) of a moving image, a still image, or the like is changed.

Although the linearity shift of the reference signal is exemplified as the cause of the linearity shift described above, a signal other than the reference signal or a circuit element other than the reference signal supply unit 25 may cause the linearity shift. Even in such a case, the correction method of the present embodiment is effective.

Second Embodiment

The photoelectric conversion device 100 of the present embodiment selects the gain of the amplifying unit 20 from a plurality of types and performs AD conversion according to the level of the signal output from the pixel 1. That is, the photoelectric conversion device 100 of the present embodiment has a configuration in which an analog signal can be amplified with a variable gain at a time point before being input to the comparison circuit 301. In the description of the present embodiment, the description of elements common to the first embodiment may be omitted or simplified.

Figure 13:
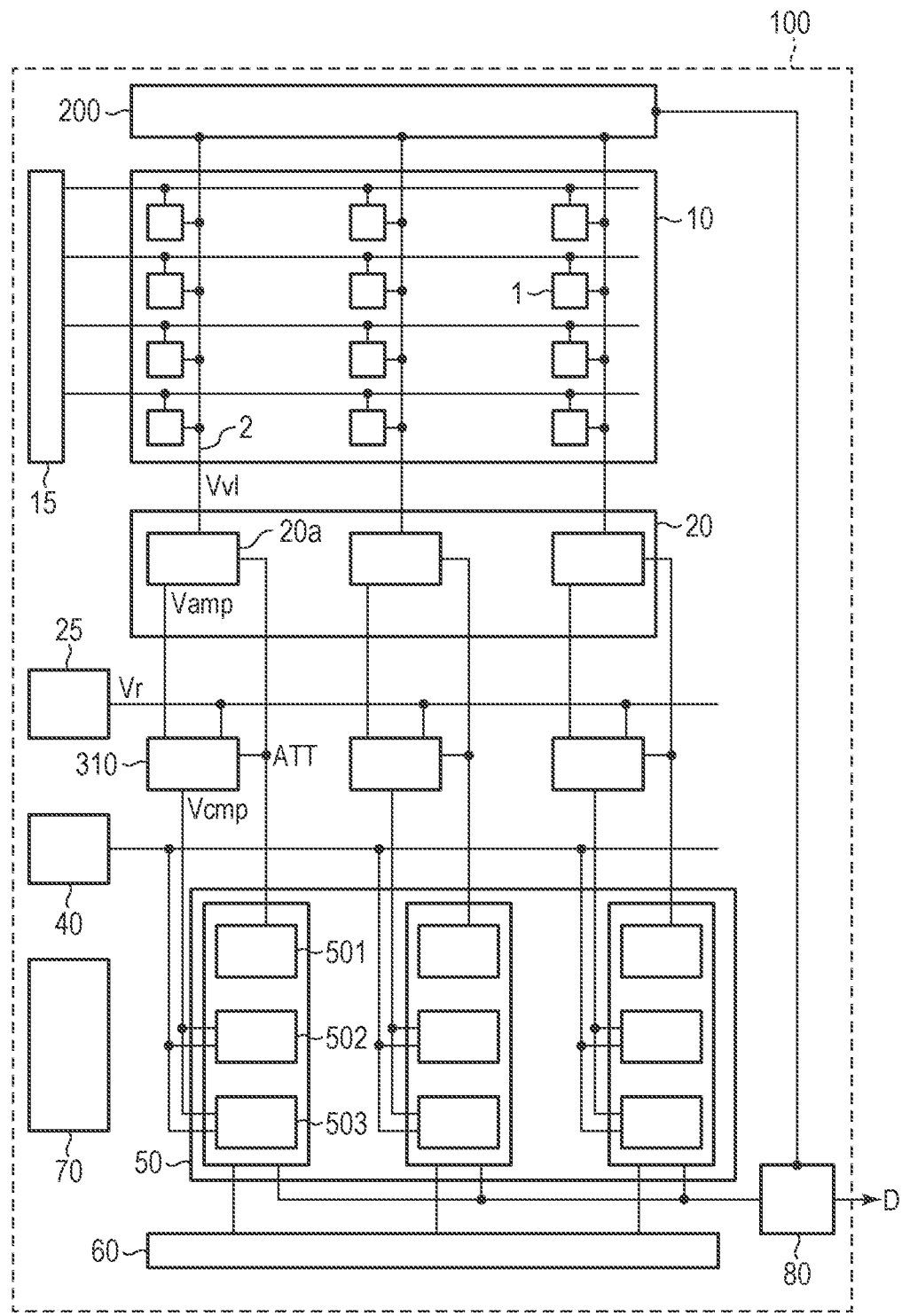
FIG. 13 is a diagram illustrating a configuration example of a photoelectric conversion device according to a second embodiment.

FIG. 13 is a diagram illustrating a configuration example of the photoelectric conversion device 100 according to the present embodiment. It is assumed that the photoelectric conversion device 100 illustrated in FIG. 13 is an imaging device that acquires an image. Although the photoelectric conversion device 100 illustrated in FIG. 13 is formed on the same semiconductor substrate, elements constituting the photoelectric conversion device 100 may be formed separately in a plurality of semiconductor substrates.

The photoelectric conversion device 100 includes a pixel unit 10, a vertical scanning circuit 15, an amplifying unit 20, a reference signal supply unit 25, a comparison gain setting circuit 310, a counter 40, a memory unit 50, a horizontal scanning circuit 60, a TG 70, a DSP 80, and a test signal supply unit 200. The pixel unit 10 includes a plurality of pixels 1 arranged in a plurality of rows and a plurality of columns. FIG. 13 illustrates an example in which the pixel unit 10 includes pixels 1 arranged in four rows and three columns. However, the arrangement of the pixel unit 10 is not limited to this. Since the configuration of the pixel 1 is the same as that of the first embodiment, description thereof will be omitted. A plurality of pixels 1 arranged in the same column are commonly connected to one column signal line 2. A signal supplied to the amplifying unit 20 via the column signal line 2 is referred to as a column signal Vvl. When a signal is read from the pixel 1 to the column signal line 2, the column signal Vvl has a value corresponding to the signal output from the pixel. In FIG. 13, wirings for supplying control signals from the TG 70 to the respective units are not illustrated.

The amplifying unit 20 has column amplifying units 20a corresponding to the respective column signal lines 2. The column amplifying unit 20a amplifies the column signal Vvl to generate an amplified signal Vamp, and supplies the amplified signal Vamp to the comparison gain setting circuit 310. As will be described later, the column amplifying unit 20a generates an amplified signal Vamp by selecting one of a plurality of gains and amplifying the column signal Vvl. When the column signal Vvl has a value corresponding to the output signal from the pixel, the column amplifying unit 20a amplifies the output signal.

Figure 14:
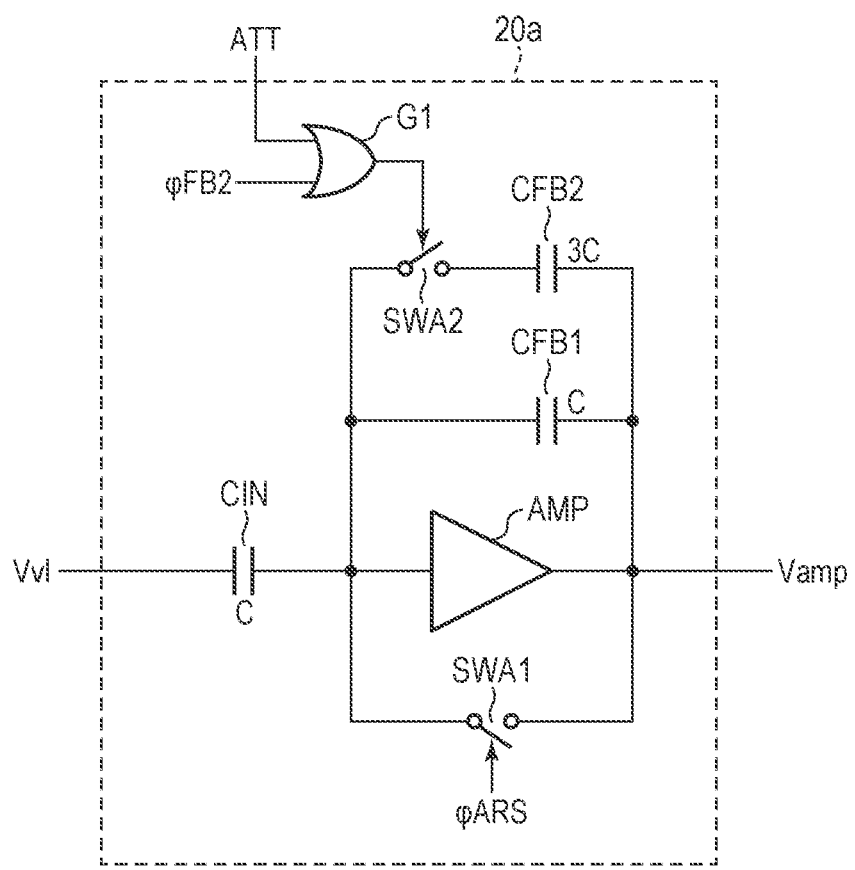
FIG. 14 is a diagram illustrating a configuration example of a column amplifying unit according to the second embodiment.

FIG. 14 is a diagram illustrating a configuration example of the column amplifying unit 20a according to the present embodiment. The column amplifying unit 20a includes an inverting amplifier AMP, capacitors CIN, CFB1, and CFB2, switches SWA1 and SWA2, and an OR gate G1. The column signal Vvl is supplied to an input terminal of the inverting amplifier AMP via the capacitor CIN. The switch SWA1 and the capacitor CFB1 are connected in parallel between the input terminal and an output terminal of the inverting amplifier AMP. The switch SWA2 and the capacitor CFB2 connected in series are further connected in parallel between the input terminal and the output terminal of the inverting amplifier AMP.

The capacitor CFB1 acts as a feedback capacitor. The OR gate G1 outputs the logical sum of the setting signal ATT and the control signal φFB2 to the control terminal of the switch SWA2. That is, on/off of the switch SWA2 is controlled by the logical sum of the setting signal ATT and the control signal φFB2. When the logical sum is at the H level, the switch SWA2 is turned on, and the capacitor CFB2 acts as a feedback capacitor. When the logical sum is at the L level, the switch SWA2 is turned off, and the capacitor CFB2 does not act as a feedback capacitor. The setting signal ATT is a signal indicating the setting of the gain of the column amplifying unit 20a, and is input from the comparison gain setting circuit 310.

The switch SWA1 is turned on when the control signal φARS is at the H level, and charges accumulated in the capacitors CFB1 and CFB2 are reset. As an example, the capacitance values of the capacitors CIN, CFB1, and CFB2 of the present embodiment are C, C, and 3C, respectively. When the switch SWA2 is turned off, the gain of the column amplifying unit 20a is set to one, and when the switch SWA2 is turned on, the gain of the column amplifying unit 20a is set to four. The inverting amplifier AMP outputs a signal acquired by amplifying the column signal Vvl with the gain set in this way as the amplified signal Vamp. The capacitance values of the capacitors CIN, CFB1, and CFB2 can be appropriately set according to gains to be set in the column amplifying unit 20a, and are not limited to the above-described example.

Figure 15:
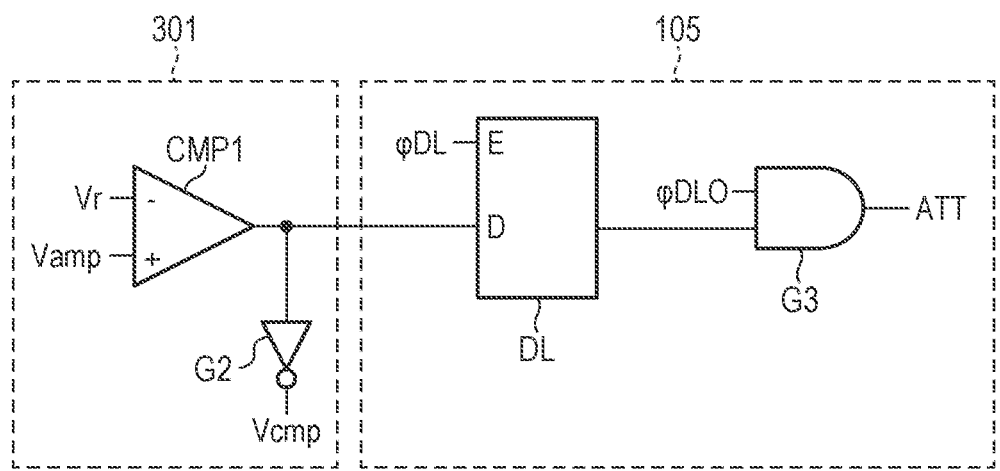
FIG. 15 is a diagram illustrating a configuration example of a comparison gain setting circuit according to the second embodiment.

FIG. 15 is a diagram illustrating a configuration example of a comparison gain setting circuit 310 according to the present embodiment. The configuration and operation of the comparison gain setting circuit 310 and its peripheral circuit will be described with reference to FIGS. 13 and 15. The comparison gain setting circuit 310 includes a comparison circuit 301 and a setting circuit 105.

First, an outline of operations of the comparison circuit 301 and the setting circuit 105 will be described. The comparison circuit 301 is supplied with the reference signal Vr from the reference signal supply unit 25, in addition to the amplified signal Vamp from the column amplifying unit 20a. The reference signal supply unit 25 outputs a reference signal Vr whose potential changes with time in response to a control signal from the TG 70. In the present embodiment, the reference signal Vr includes a ramp signal. The ramp signal is a signal in which the potential thereof changes at a constant rate over time. The comparison circuit 301 compares the amplified signal Vamp with the reference signal Vr, and supplies a comparison signal Vcmp corresponding to the comparison result to the memory unit 50. As an example, the comparison circuit 301 of the present embodiment sets the comparison signal Vcmp to the L level when the potential of the amplified signal Vamp is equal to or greater than the potential of the reference signal Vr, and sets the comparison signal Vcmp to the H level when the potential of the amplified signal Vamp is less than the potential of the reference signal Vr. For example, a comparator may be used as the comparison circuit 301.

In addition to the amplified signal Vamp, the threshold signal Vsh is supplied to the comparison circuit 301. The threshold signal Vsh is supplied by changing the potential of the reference signal Vr supplied from the reference signal supply unit 25 to a predetermined value.

The comparison circuit 301 compares the potential of the amplified signal Vamp with the potential of the threshold signal Vsh. Based on the comparison result, the setting circuit 105 sets the gain of the column amplifying unit 20a. The setting circuit 105 supplies a setting signal ATT indicating the gain setting of the column amplifying unit 20a to the column amplifying unit 20a and the memory unit 50. As an example, the setting circuit 105 of the present embodiment sets the setting signal ATT to the L level when the potential of the amplified signal Vamp is less than the potential of the threshold signal Vsh, and sets the setting signal ATT to the H level when the potential of the amplified signal Vamp is equal to or greater than the threshold signal Vsh. The column amplifying unit 20a maintains or changes the gain used for amplifying the column signal Vvl in accordance with the level of the setting signal ATT. That is, the setting circuit 105 determines whether or not the column amplifying unit 20a should change the gain. The gain is changed while the column amplifying unit 20a amplifies the signal from the pixel.

The memory unit 50 is supplied with the count signal CNT from the counter 40 in addition to the setting signal ATT and the comparison signal Vcmp from the comparison gain setting circuit 310. In response to a control signal from the TG 70, the reference signal supply unit 25 starts increasing the potential of the ramp signal and starts counting. The counter 40 counts up the count value represented by the count signal CNT over time.

The memory unit 50 includes a flag memory 501, a first memory 502, and a second memory 503 which are provided corresponding to each column of the pixel unit 10. The flag memory 501 holds the level of the setting signal ATT supplied from the setting circuit 105. The first memory 502 and the second memory 503 hold count values at the time when the level of the comparison signal Vcmp is switched. That is, the reference signal supply unit 25, the comparison gain setting circuit 310, the counter 40, and the memory unit 50 constitute an AD conversion circuit that converts the amplified signal Vamp into a digital value. The second memory 503 holds a digital value corresponding to the amplified signal Vamp output from the amplifying unit 20 in a state where the pixel 1 is reset. The first memory 502 holds a digital value corresponding to the amplified signal Vamp output from the amplifying unit 20 in a state where the photoelectric conversion signal is read from the pixel 1.

As illustrated in FIGS. 13 and 15, the column amplifying unit 20a, the setting circuit 105, the comparison gain setting circuit 310, the flag memory 501, the first memory 502, and the second memory 503 are arranged corresponding to a column signal line 2. The horizontal scanning circuit 60 sequentially reads digital values from memories of respective columns to the DSP 80. The DSP 80 generates a digital signal D corresponding to the pixel signal based on the digital value read from the memory unit 50. An output circuit (not illustrated in FIG. 13) outputs the digital signal D to the outside of the photoelectric conversion device 100. The digital signal D represents a pixel value of each pixel 1. The TG 70 controls the operation of each component of the photoelectric conversion device 100 by supplying a control signal to each component.

Referring again to FIG. 15, a circuit configuration example and an operation of the comparison gain setting circuit 310 will be described in more detail. The comparison circuit 301 includes a comparator CMP1 and a NOT gate G2. The setting circuit 105 includes a D latch circuit DL and an AND gate G3.

An amplified signal Vamp is supplied to a non-inverting input terminal of the comparator CMP1. The reference signal Vr is supplied to an inverting input terminal of the comparator CMP1. In other words, during a period in which the potential of the reference signal Vr is the potential of the threshold signal Vsh, the threshold signal Vsh is supplied to the inverting input terminal of the comparator CMP1. The comparator CMP1 determines the magnitude relationship between the potential of the amplified signal Vamp and the potential of the threshold signal Vsh, and supplies a signal corresponding to the determination result to a D terminal of the D latch circuit DL. The comparator CMP1 outputs an L-level signal when the potential of the amplified signal Vamp is less than the potential of the threshold signal Vsh, and outputs an H-level signal when the potential of the amplified signal Vamp is equal to or greater than the potential of the threshold signal Vsh. The comparator CMP1 compares the amplified signal Vamp with the reference signal Vr. The NOT gate G2 outputs a comparison signal Vcmp acquired by inverting the comparison result to the memory unit 50.

The D latch circuit DL holds the level of the signal supplied to the D terminal in response to the control signal φDL supplied to an E terminal. The D latch circuit DL supplies a signal of the level of the held signal to a first input terminal of the AND gate G3. A control signal φDLO is supplied to a second input terminal of the AND gate G3. When the control signal φDLO is at the H level, the AND gate G3 outputs a signal of the level of the signal held by the D latch circuit DL to the amplifying unit 20 and the memory unit 50 as the setting signal ATT. When the control signal φDLO is at the L level, the AND gate G3 outputs a signal of the L level to the amplifying unit 20 and the memory unit 50 as the setting signal ATT.

Figure 16:
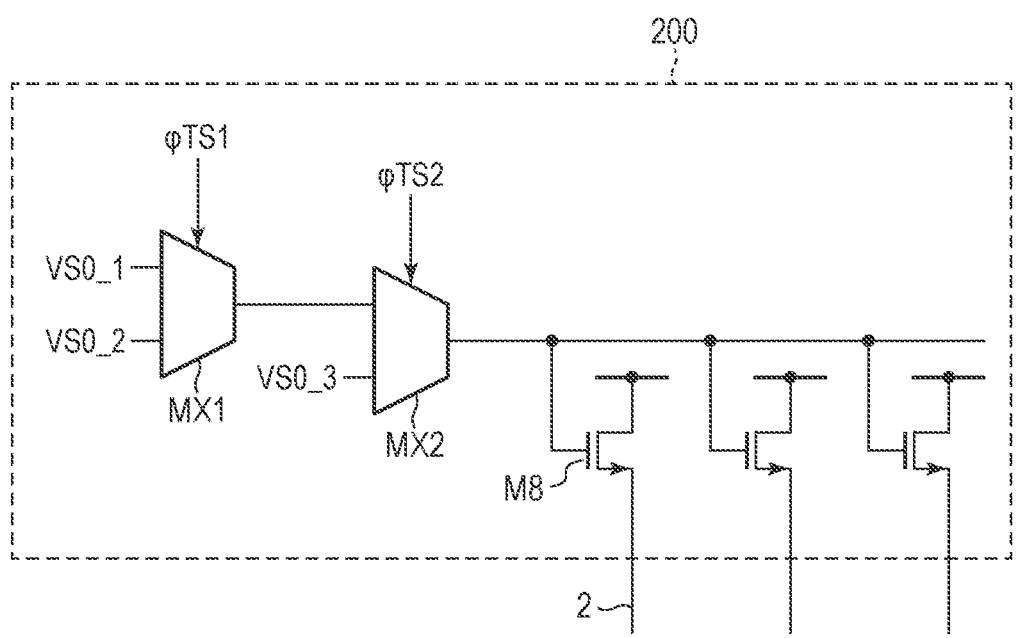
FIG. 16 is a diagram illustrating a configuration example of a test signal supply unit according to the second embodiment.

FIG. 16 is a diagram illustrating a configuration example of the test signal supply unit 200 according to the present embodiment. A circuit configuration example of the test signal supply unit 200 will be described with reference to FIG. 16. The test signal supply unit 200 includes a multiplexer MX1 controlled by a control signal φTS1, a multiplexer MX2 controlled by a control signal φTS2, and a transistor M8 connected to the column signal line 2 of each column.

The transistor M8 is an NMOS transistor. The source of the transistor M8 is connected to the column signal line 2, and the drain of the transistor M8 is connected to the power supply line. The transistor M8 controls the potential of the column signal line 2 in accordance with the gate potential controlled by the multiplexer MX2. A potential VS0_3 and the output signal of the multiplexer MX1 are supplied to the multiplexer MX2. A potential VS0_1 and a potential VS0_2 are supplied to the multiplexer MX1. The multiplexer MX1 outputs the potential VS0_1 when the control signal φTS1 is at the L level, and outputs the potential VS0_2 when the control signal φTS1 is at the H level. A signal supplied from the test signal supply unit 200 to the column signal lines 2 when the potential VS0_1 is supplied to the gates of the transistors M8 is referred to as a test signal VS1. A signal supplied from the test signal supply unit 200 to the column signal lines 2 when the potential VS0_2 is supplied to the gates of the transistors M8 is referred to as a test signal VS2. The test signal VS1 and the test signal VS2 are analog signals having potentials different from each other.

When the control signal φTS2 is at the L level, the multiplexer MX2 selects the potential VS0_3, and the potential VS0_3 is supplied to the gates of the transistors M8. On the other hand, when the control signal φTS2 is at the H level, the multiplexer MX2 selects the output signal of the multiplexer MX1, and the potential VS0_1 or the potential VS0_2 is supplied to the gates of the transistors M8.

In the correction value calculating operation, the control signal φTS2 becomes the H level, and the test signal VS1 or the test signal VS2 is supplied to the column signal lines 2 as the column signal Vvl. In the pixel signal reading operation, the control signal φTS2 becomes the L level, and the potential of the column signal lines 2 is clipped according to the potential VS0_3. By the test signal supply unit 200 having such a clip function, it is possible to prevent an excessive voltage drop of the column signal line 2, which may occur when the level of the pixel signal locally increases, and to reduce smear.

Next, the operation of the photoelectric conversion device 100 will be described. The operation of the photoelectric conversion device 100 is performed by the TG 70 controlling the operation of each component of the photoelectric conversion device 100. The operation of the pixel 1 is performed by the TG 70 controlling the vertical scanning circuit 15. The reading of digital values from the memory unit 50 to the DSP 80 is performed by the TG 70 controlling the horizontal scanning circuit 60. The photoelectric conversion device 100 mainly performs a pixel signal reading operation, a correction value calculating operation, a pixel value calculating operation, and a correction value calculation potential adjusting operation. The pixel signal reading operation is an operation of reading a pixel signal from a pixel and holding a digital value corresponding to the pixel signal in the memory unit 50. The correction value calculating operation is an operation of calculating a correction value for correcting the digital value. The pixel value calculating operation is an operation of calculating a pixel value by correcting the digital value. The correction value calculation potential adjusting operation will be described later. Hereinafter, the pixel signal reading operation, the pixel value calculating operation, the correction value calculating operation, and the correction value calculation potential adjusting operation will be described in this order.

Figure 17:
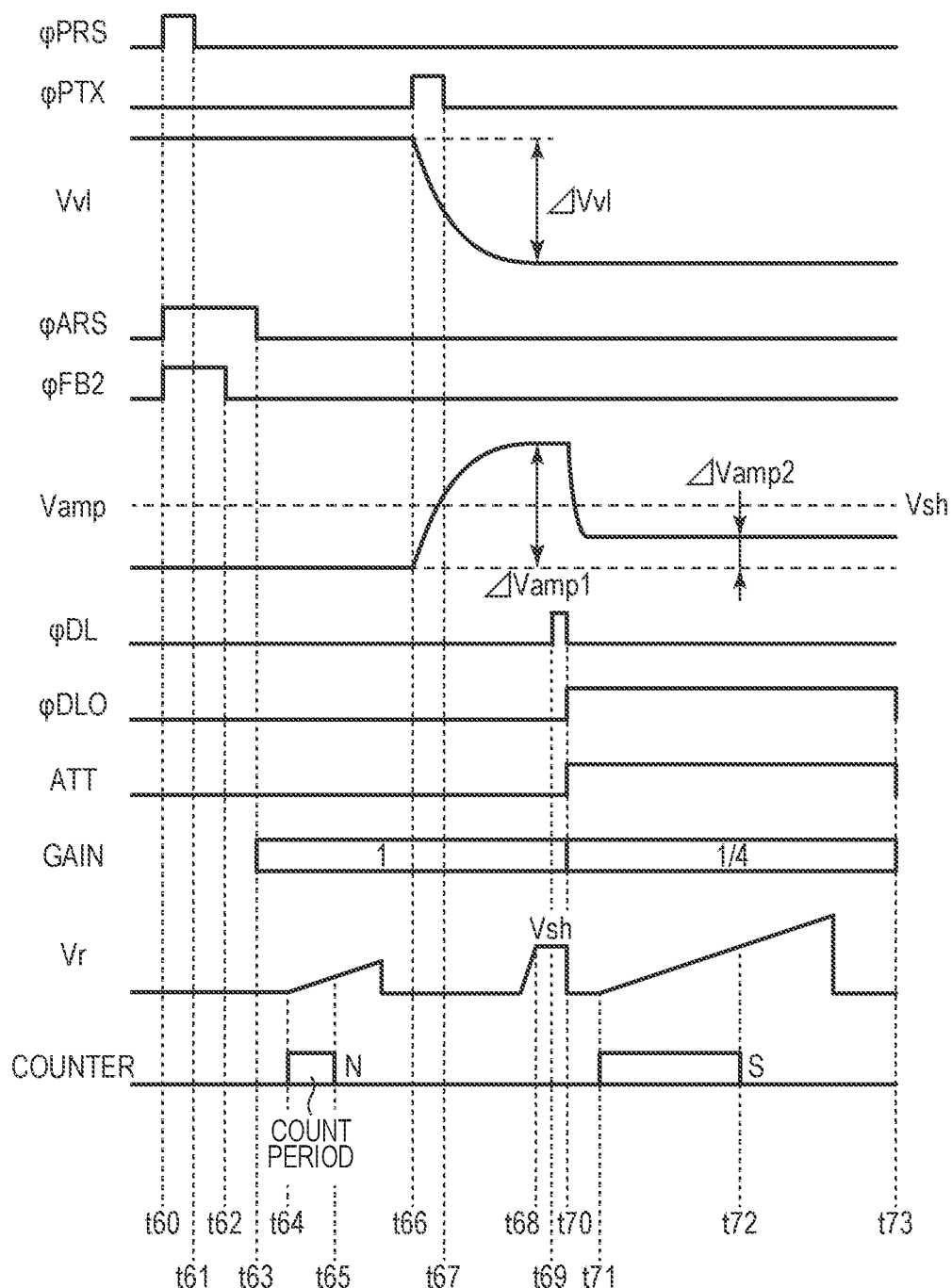
FIG. 17 is a timing chart for explaining an operation of the photoelectric conversion device according to the second embodiment.

FIG. 17 is a timing chart for explaining the operation of the photoelectric conversion device 100 according to the present embodiment. The pixel signal reading operation will be described with reference to the timing chart of FIG. 17. FIG. 17 illustrates an operation for reading out a pixel signal once from a pixel 1. The operations illustrated in FIG. 17 are performed simultaneously for a plurality of pixels 1 arranged in the same row. FIG. 17 illustrates the levels of the control signals φPRS, φPTX, φARS, φFB2, φDL, and φDLO, the column signal Vvl, the amplified signal Vamp, the setting signal ATT, the reference signal Vr, the gain of the column amplifying unit 20a, and the count period of the counter 40.

The photoelectric conversion device 100 reads a pixel signal from each pixel of the pixel unit 10 by performing the operation illustrated in FIG. 17 on each of a plurality of pixel rows constituting the pixel unit 10. The vertical scanning circuit 15 maintains the control signal φPSEL supplied to the pixel 1 to be subjected to the pixel signal reading operation at the H level and maintains the control signal φPSEL supplied to the other pixels 1 at the L level throughout the period illustrated in FIG. 17.

When the pixel signal reading operation is started, during a period from time t60 to time t61, the vertical scanning circuit 15 temporarily sets the control signal φPRS to the H level. Thus, the reset transistor MRS is turned on, and the pixel 1 is reset. At this time, a signal corresponding to the reset state of the pixel 1 is read to the column signal line 2. This signal is referred to as a reset signal. When the reset signal is read to the column signal line 2, the column signal Vvl has a value corresponding to this signal.

During a period from the time t60 to the time t62, the TG 70 temporarily sets the control signal φFB2 to the H level in parallel with the reset of the pixel. Further, during a period from time t60 to time t63, the TG 70 temporarily sets the control signal φARS to the H level in parallel with the reset of the pixel. By these operations, the charges accumulated in the capacitors CFB1 and CFB2 are reset.

During the above-described operation, the TG 70 sets the control signal φDLO to the L level. As a result, the setting signal ATT output from the setting circuit 105 becomes the L level. After time t62, since both the setting signal ATT and the control signal φFB2 are at the L level, the switch SWA2 of the column amplifying unit 20a is off, and the capacitance value of the feedback capacitor connected to the inverting amplifier AMP is C. Since the capacitance value of the input capacitor connected to the inverting amplifier AMP is also C, the gain of the column amplifying unit 20a is set to one (first gain).

At time t64, the reference signal supply unit 25 starts supplying the ramp signal as the reference signal Vr in response to the control signal from the TG 70. In other words, the reference signal supply unit 25 starts to change the potential of the reference signal Vr at a constant rate with respect to time. At the same time, the counter 40 starts counting up the count value to be output from zero in response to the control signal from the TG 70.

At time t65, when the potential of the reference signal Vr exceeds the potential of the amplified signal Vamp and the comparison signal Vcmp is switched from the L level to the H level, the second memory 503 holds the count value from the counter 40 at that time point. This count value corresponds to a digital value acquired by performing AD conversion on the amplified signal Vamp acquired by amplifying the reset signal with a gain of one. Hereinafter, this digital value is referred to as N.

From time t66 to time t67, the vertical scanning circuit 15 temporarily sets the control signal φPTX to the H level. Thus, the charges accumulated in the photoelectric conversion unit PD are transferred to the floating diffusion FD. Thereafter, the photoelectric conversion signal is read out from the pixel 1 to the column signal line 2, and the column signal Vvl has a value corresponding to the photoelectric conversion signal. The amount of change in the column signal Vvl (that is, the difference between the photoelectric conversion signal and the reset signal) based on the reset time of the pixel 1 is represented by ΔVv1. ΔVv1 is a value corresponding to the incident light amount to the pixel 1. As the column signal Vvl changes, the amplified signal Vamp also changes. The amount of change in the amplified signal Vamp in a state where the gain of the column amplifying unit 20a is set to one is referred to as ΔVamp1.

During a period from time t68 to time t70, the TG 70 changes the potential of the reference signal Vr supplied by the reference signal supply unit 25 to the potential of the threshold signal Vsh. The threshold signal Vsh is set to ¼ or less of the output dynamic range of the column amplifying unit 20a. The photoelectric conversion device 100 performs different operations depending on whether the amplified signal Vamp is greater than or equal to the threshold signal Vsh or less than the threshold signal Vsh. Hereinafter, a case where the potential of the amplified signal Vamp acquired by amplifying the photoelectric conversion signal with a gain of one is greater than the potential of the threshold signal Vsh will be described.

The TG 70 temporarily sets the control signal φDL to the H level from time t69 to time t70, which is a period after a predetermined time has elapsed after the vertical scanning circuit 15 sets the control signal φPTX to the L level. In the example of FIG. 17, since the potential of the amplified signal Vamp is greater than the potential of the threshold signal Vsh, the D latch circuit DL holds the H level.

At time t70, TG70 sets the control signal φDLO to the H level. The setting circuit 105 outputs the signal held in the D latch circuit DL, and the setting signal ATT becomes the H level. Thus, the switch SWA2 of the column amplifying unit 20a is turned on, the capacitor CFB2 is connected to the inverting amplifier AMP, and the combined capacitance value of the feedback capacitor connected to the inverting amplifier AMP becomes 4 C. Since the capacitance value of the input capacitor connected to the inverting amplifier AMP is C, the gain of the column amplifying unit 20a is set to ¼ (second gain). Accordingly, the potential of the amplified signal Vamp also changes. The amount of change in the amplified signal Vamp in a state where the gain of the amplifying unit 20 is set to ¼ is referred to as ΔVamp2.

Thereafter, from time t71 to time t72, the photoelectric conversion device 100 performs AD conversion on the amplified signal Vamp acquired by amplifying the signal from the pixel. This process is substantially the same as the process for the reset signal from time t64 to time t65. The first memory 502 holds a digital value acquired by performing AD conversion on the amplified signal Vamp. Hereinafter, this digital value is referred to as S. Thereafter, the flag memory 501 holds the level of the setting signal ATT. At time t73, the TG 70 sets the setting signal ATT to the L level by setting the control signal φDLO to the L level, and the pixel signal reading operation shifts to reading of the next row.

By the above operation, the level of the setting signal ATT when the pixel signal is AD converted is held in the flag memory 501. The digital value N representing the amplified reset signal is held in the second memory 503, and the digital value S representing the amplified photoelectric conversion signal is held in the first memory 502. As in the above-described example, when the gain of the column amplifying unit 20a is changed from one to ¼, the flag memory 501 holds the H-level setting signal ATT, and the first memory 502 holds the digital value representing the photoelectric conversion signal amplified with the gain of ¼. On the other hand, when the potential of the amplified signal Vamp acquired by amplifying the photoelectric conversion signal with the gain of 1 is less than the potential of the threshold signal Vsh, the gain of the column amplifying unit 20a is maintained to be one. In this case, the flag memory 501 holds the L-level setting signal ATT, and the first memory 502 holds the digital value S representing the photoelectric conversion signal amplified with the gain of one. In both the case where the gain of the column amplifying unit 20a is changed from one to ¼ and the case where the gain is maintained at one, the digital value N representing the reset signal amplified with gain of one is held in the second memory 503.

Next, the pixel value calculating operation will be described. The DSP 80 calculates a pixel value based on the digital value held in the memory unit 50. First, a case where the setting signal ATT of the L level is held in the flag memory 501 will be described. In this case, the first memory 502 holds the digital value S representing the photoelectric conversion signal amplified with the gain of one, and the second memory 503 holds the digital value N representing the reset signal amplified with the gain of one. The DSP 80 calculates a pixel value by performing digital correlated double sampling (CDS) processing using these digital values. Specifically, the DSP 80 calculates a difference between the digital value S and the digital value N, that is, "S−N", and sets this value as a pixel value.

Next, a case where the flag memory 501 holds the H-level setting signal ATT will be described. In this case, the first memory 502 holds a digital value S representing a pixel signal amplified with a gain of ¼, and the second memory 503 holds a digital value N representing a reset signal amplified with a gain of one. Therefore, the DSP 80 cannot calculate a correct pixel value merely by performing digital CDS processing using the digital values S and N as they are. Further, since it is difficult to precisely control the gain, even if the gain of the column amplifying unit 20a is set to ¼, the actual amplified signal Vamp may be amplified with gains of different values. The reason will be described with reference to FIG. 18.

Figure 18:
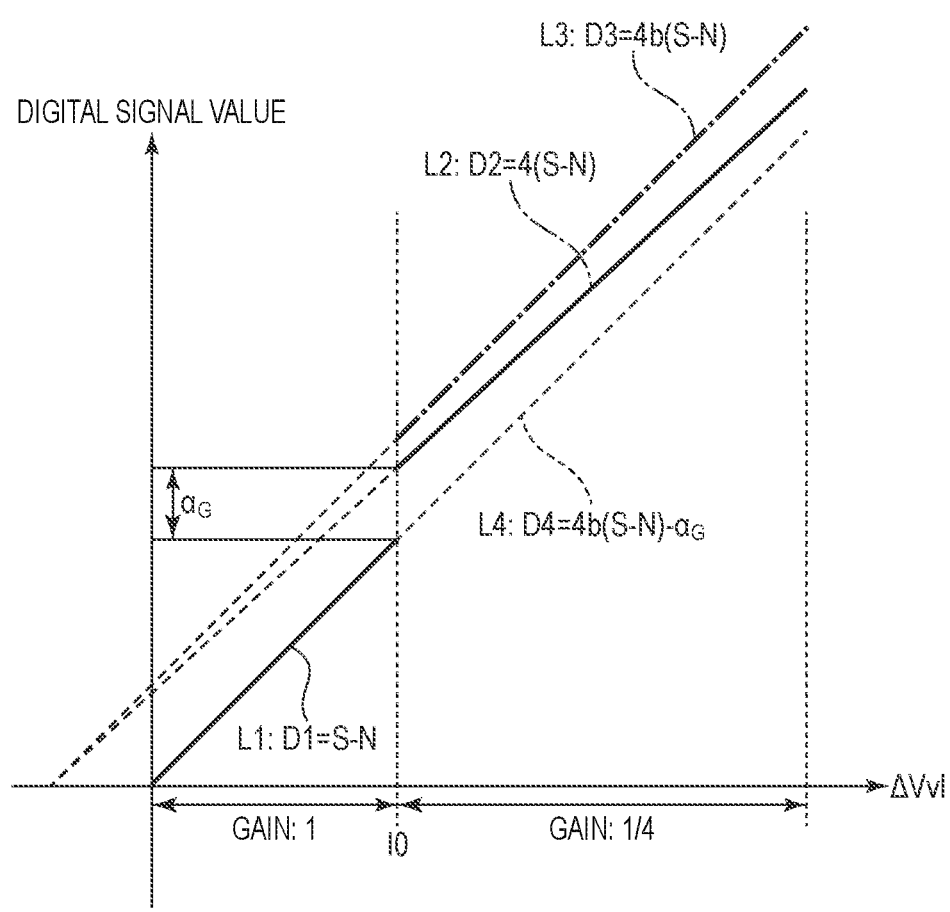
FIG. 18 is a graph illustrating correction value calculation according to the second embodiment.

FIG. 18 is a graph illustrating correction value calculation according to the present embodiment. The horizontal axis of the graph in FIG. 18 represents the change amount ΔVv1 of the column signal Vvl. The vertical axis of the graph in FIG. 18 represents digital signal values. The amount of change ΔVv1 corresponds to the incident light amount incident on the pixel 1. When the column signal Vvl has a value corresponding to the reset signal, the change amount ΔVv1 is zero (the origin of the graph in FIG. 18). The change amount ΔVv1 is divided into a region in which the column amplifying unit 20a outputs a signal with a gain of one and a region in which the column amplifying unit 20a outputs a signal with a gain of ¼. "IO" is the boundary of two regions.

The straight line L1 indicates the relationship between the change amount ΔVv1 and the digital signal D1 calculated by the following equation (4) in a range in which the gain of the column amplifying unit 20a is set to one.

$$D1 = S - N \quad (4)$$

Since the digital value S and the digital value N are both values generated in a state where the gain of the column amplifying unit 20a is set to one, a digital signal D1 appropriately representing the incident light amount is acquired by performing digital CDS processing. For example, when the change amount ΔVv1 is zero, the digital signal D1 is also zero. The DSP 80 sets the digital signal D1 as the output signal of the photoelectric conversion device 100 when the gain of the amplifying unit 20 is set to one.

The straight line L2 indicates the relationship between the change amount ΔVv1 and the digital signal D2 calculated by the following equation (5) in a range in which the gain of the column amplifying unit 20a is set to ¼.

$$D2=4(S-N) \quad (5)$$

In equation (5), since "S−N" acquired by digital CDS processing is multiplied by "4", which is the reciprocal of gain, the slope of the straight line L2 theoretically matches the slope of the straight line L1. However, due to gain errors, the slopes of these straight lines may not match. In this case, even if offset correction described later is performed, the digital signal D does not have good linearity. Therefore, the DSP 80 of the present embodiment determines a coefficient to be multiplied by "S−N" based on the actually acquired amplified signal Vamp, not from the theoretical value of "4", which is the reciprocal of the gain.

In one example, the DSP 80 calculates a correction coefficient b for correcting the gain correction value, and multiplies the reciprocal "4" of the theoretical value of the gain by the correction coefficient b to acquire a value as the gain correction value $\beta_G$. Specifically, the DSP 80 calculates the correction coefficient b so that the slope of the straight line L3 representing the digital signal D3 calculated by the following equation (6) matches the slope of the straight line L1. A method of calculating the correction coefficient b will be described later.

$$D3=4b(S-N) \quad (6)$$

Thereafter, the DSP 80 calculates a digital value by subtracting the offset correction value $\alpha_G$ from D3. That is, the DSP 80 calculates the digital signal D4 by the following equation (7).

$$D4=4b(S-N)-\alpha_G \quad (7)$$

The straight line L4 represents the relationship between the change amount ΔVv1 included in the range in which the gain of the column amplifying unit 20a is set to ¼ and the digital signal D4 calculated according to the above-described equation (7). As illustrated in FIG. 18, the straight line L4 has good linearity with respect to the straight line L1. The DSP 80 outputs the digital signal D4 as the above-described digital signal D when the gain of the column amplifying unit 20a is set to ¼ (that is, when the H level is held in the flag memory 501).

Figure 19:
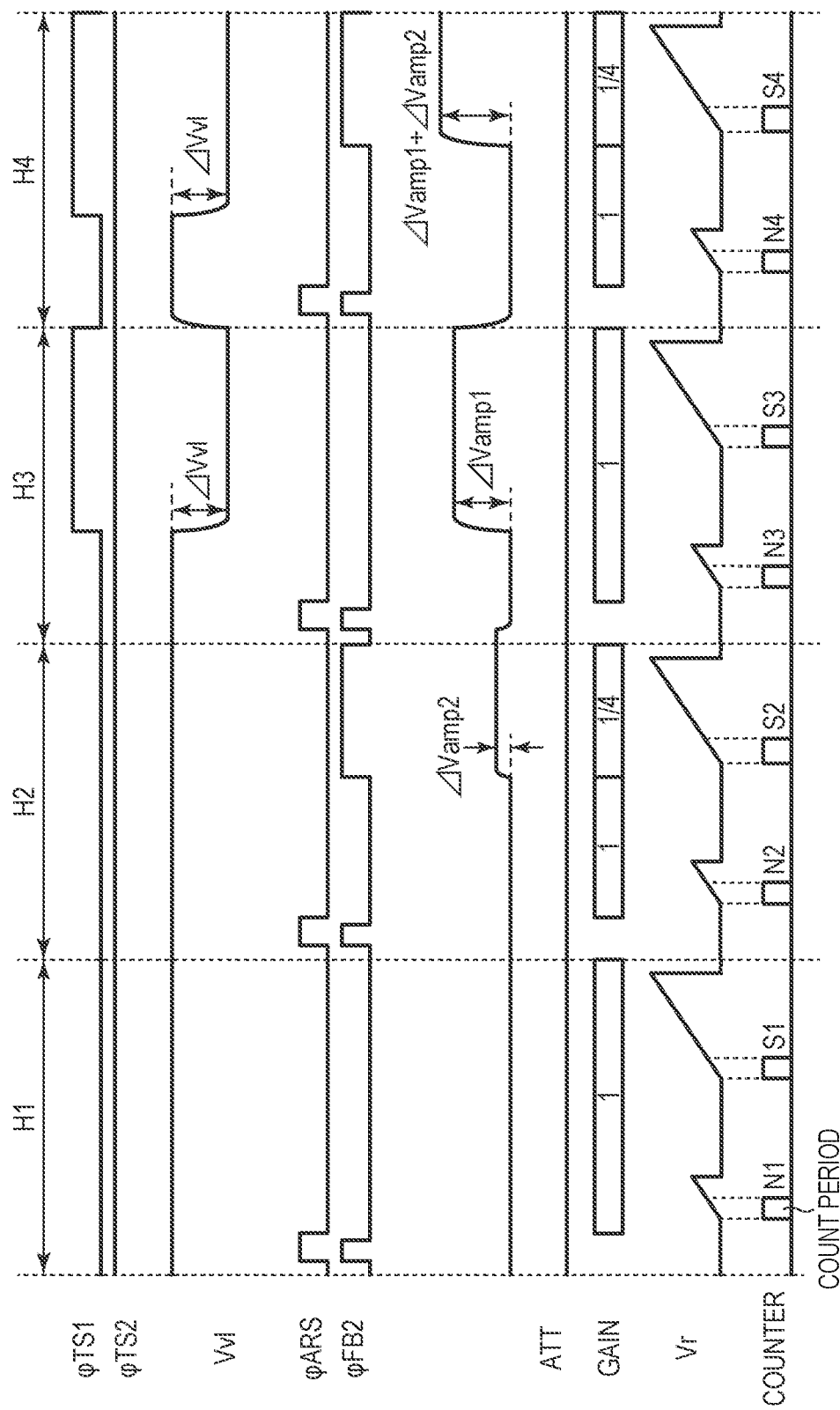
FIG. 19 is a timing chart illustrating a correction value calculating operation according to the second embodiment.

FIG. 19 is a timing chart illustrating a correction value calculating operation according to the present embodiment. The correction value calculating operation will be described with reference to the timing chart of FIG. 19. FIG. 19 illustrates an operation of calculating a correction value corresponding to a column amplifying unit 20a. This correction value is used for a plurality of pixels 1 commonly connected to the column amplifying unit 20a. The vertical scanning circuit 15 maintains the control signal φPSEL supplied to all the pixels 1 at the L level throughout the period illustrated in FIG. 19. The correction value calculating operation is performed in four consecutive periods H1 to H4.

In the period H1, the test signal supply unit 200 supplies the test signal VS1 as the column signal Vvl. In the period H1, the TG 70 holds the digital value N1 in the second memory 503 and then holds the digital value S1 in the first memory 502 by the same operation as the pixel signal reading operation. In the period H1, when the TG 70 sets the control signal φDLO to the L level, the setting circuit 105 outputs the L-level setting signal ATT to the column amplifying unit 20a. Therefore, the digital value S1 (third digital value) and the digital value N1 represent the amplified signal Vamp acquired by a gain of one. The DSP 80 reads the digital values N1 and S1 from the memory unit 50 and holds them in a memory inside the DSP 80.

In the subsequent period, signal acquisitions are performed by the same process while switching the relationship between the column signal Vvl and the gain. In the period H2, the digital value N2 is generated in a state where the column signal Vvl is the test signal VS1 and the gain is set to one. Thereafter, the digital value S2 (fourth digital signal) is generated in a state where the column signal Vvl is the test signal VS1 and the gain is set to ¼. The DSP 80 reads the digital values N2 and S2 from the memory unit 50 and holds them in a memory inside the DSP 80.

In the period H3, the digital value N3 is generated in a state where the column signal Vvl is the test signal VS1 and the gain is set to one. Thereafter, the digital value S3 (first digital value) is generated in a state where the column signal Vvl is the test signal VS2 and the gain is set to one. The DSP 80 reads the digital values N3 and S3 from the memory unit 50 and holds them in a memory inside the DSP 80.

In the period H4, the digital value N4 is generated in a state where the column signal Vvl is the test signal VS1 and the gain is set to one. Thereafter, the digital value S4 (second digital value) is generated in a state where the column signal Vvl is the test signal VS2 and the gain is set to ¼. The DSP 80 reads the digital values N4 and S4 from the memory unit 50 and holds them in a memory inside the DSP 80.

Assuming that changed gain that is set in the amplifying unit 20 is G (¼ in the above-described example), the DSP 80 calculates the correction coefficient b, the gain correction value $\beta_G$, and the offset correction value $\alpha_G$ using the following equations (8) to (10). The DSP 80 holds the gain correction value $\beta_G$ and the offset correction value $\alpha_G$ calculated in this manner in the memory inside the DSP 80.

$$b=\{(S3-N3)-(S1-N1)\}/\{(S4-N4)/G-(S2-N2)/G\} \quad (8)$$

$$\beta_G=b/G \quad (9)$$

$$\alpha_G=b(S2-N2)/G-(S1-N1) \quad (10)$$

Next, a signal value of a digital signal acquired in a case where a linearity shift occurs in the column amplifying unit 20a and a correction operation is not performed will be described with reference to FIG. 20.

Figure 20:
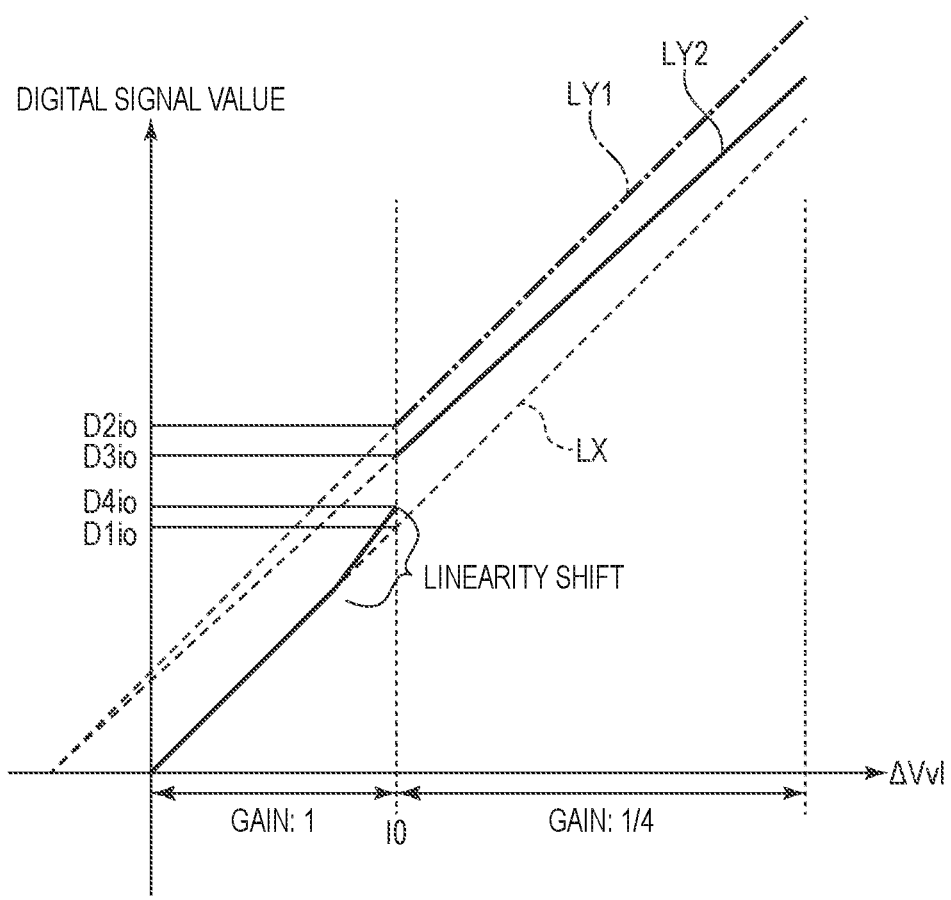
FIG. 20 is a graph illustrating a case where a correction value is not calculated.

FIG. 20 is a graph illustrating a case where a correction value is not calculated. In FIG. 20, a line LY1 indicates the relationship between the change amount ΔVv1 of the column signal Vvl and the digital signal calculated by the above equation (6) in a range in which the gain of the column amplifying unit 20a is set to ¼.

A line LY2 indicates the relationship between the change amount ΔVv1 of the column signal Vvl and the digital signal calculated by the above-described equation (5) in a range in which the gain of the column amplifying unit 20a is set to ¼. In FIG. 20, the slope of the line LY2 is illustrated assuming that the gain ratio of the column amplifying unit 20a is less than ¼ due to error.

A line LX indicates the relationship between the amount of change ΔVv1 of the column signal Vvl and the corrected digital signal value when linearity is good in a range in which the gain of the column amplifying unit 20a is set to ¼. In the boundary IO, signal values of digital signals corresponding to the lines LX, LY1, and LY2 are D1io, D2io, and D3io, respectively. Since the gain ratio of the column amplifying unit 20a is less than ¼ due to error, D3io is less than D2io.

In the example illustrated in FIG. 20, a linearity shift occurs in the vicinity of the boundary IO in the range in which the gain of the column amplifying unit 20a is set to one. Due to the linearity shift in the vicinity of the boundary IO, the signal value of the digital signal acquired in the vicinity of the boundary IO in the range in which the gain of the column amplifying unit 20a is set to one is D4io which is greater than D1io.

Next, a correction operation for reducing the offset (discontinuity) of the difference between D4io and D1io occurring at the boundary IO when there is a linearity shift illustrated in FIG. 20 will be described.

Figure 21:
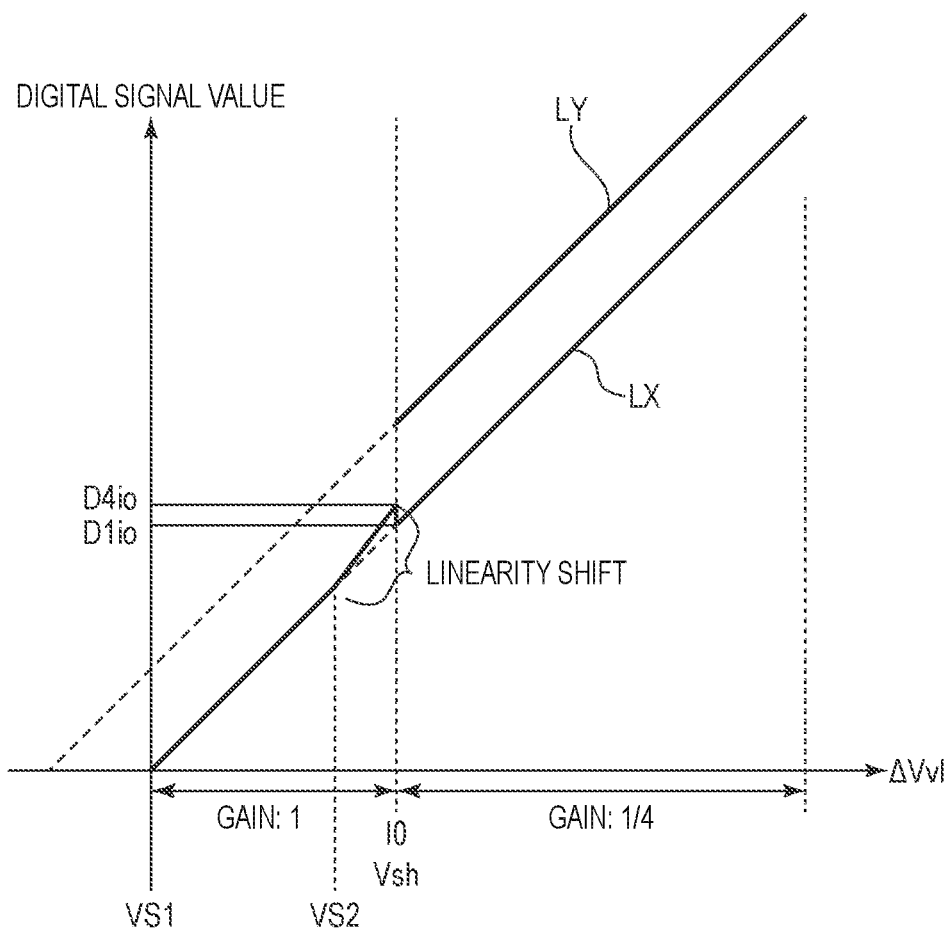
FIG. 21 is a graph illustrating an offset generated by calculating a correction value.

FIG. 21 is a graph illustrating an offset generated by calculating a correction value. First, a case where an offset occurs at the boundary IO will be described with reference to FIG. 21. Note that "VS1", "VS2", and "Vsh" in FIG. 21 indicate variations ΔVv1 corresponding to the potentials of the test signals VS1, VS2 and the threshold signal Vsh.

As described above, the boundary IO is determined by the level of the threshold signal Vsh. This is because the gain of the column amplifying unit 20a is set to ¼ when the potential of the amplified signal Vamp is equal to or greater than the potential of the threshold signal Vsh, and the gain of the column amplifying unit 20a is set to one when the potential of the amplified signal Vamp is less than the threshold signal Vsh.

The potential of the test signal VS1 used for acquiring the correction value of the present embodiment corresponds to the reset signal of the pixel 1. In the graph of FIG. 21, the potential of the test signal VS1 corresponds to the origin of the horizontal axis of the graph. The potential of the test signal VS2 is set to be ¼ or less of the output dynamic range of the column amplifying unit 20a, and VS2≤Vsh is satisfied.

FIG. 21 illustrates a case where the potential of the test signal VS2 is equal to or less than the change amount ΔVv1 in which the linearity shift occurs. Since the region between the test signal VS1 and the test signal VS2 has good linearity of the column amplifying unit 20a, the correction is performed so that no offset occurs at the change amount ΔVv1 corresponding to the test signal VS2. However, since the gain of the column amplifying unit 20a is switched at the boundary IO, the linearity shift of the column amplifying unit 20a causes an offset (D4io−D1io) at the boundary IO.

Figure 22:
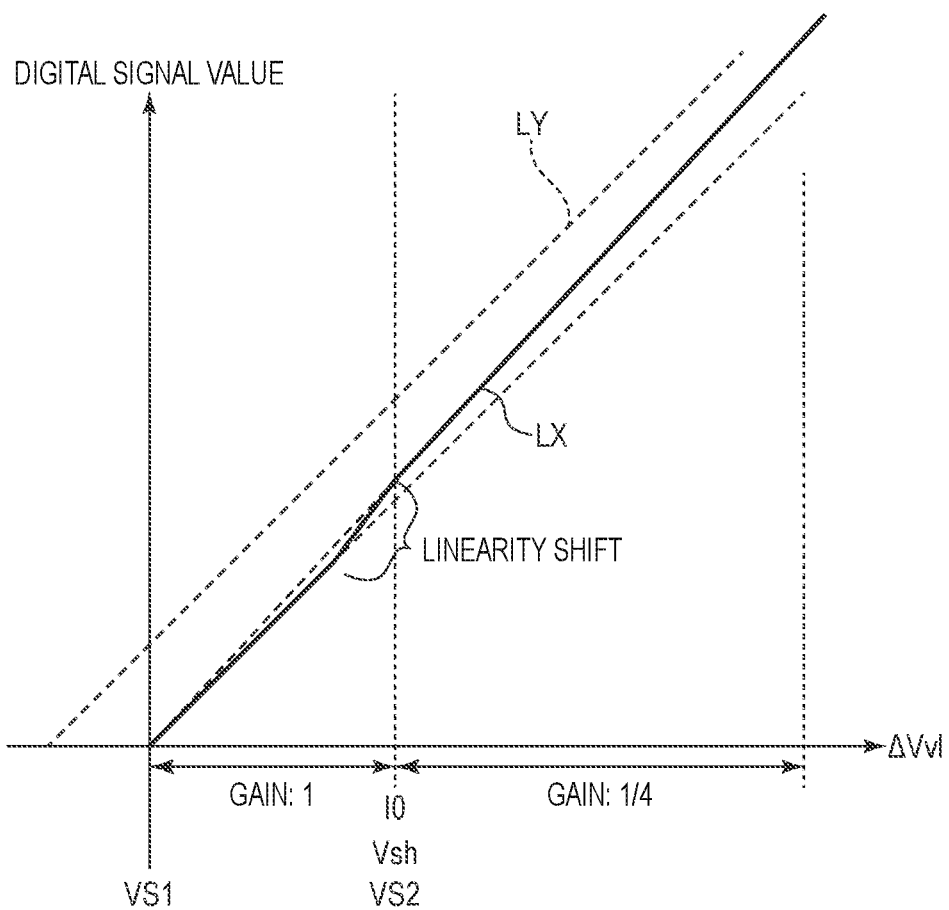
FIG. 22 is a graph illustrating a case where no offset occurs in the correction value calculation.

FIG. 22 is a graph illustrating a case where no offset occurs in the correction value calculation. A case where the potential of the test signal VS2 is equal to the potential of the threshold signal Vsh will be described with reference to FIG. 22.

Even when the potential of the test signal VS2 is equal to the potential of the threshold signal Vsh, the correction calculation is performed on the assumption that the gain of the column amplifying unit 20a is linear between the test signal VS1 and the test signal VS2 as described above. That is, the correction is performed so that the offset does not occur in the change amount ΔVv1 corresponding to the test signal VS2. Since the potential of the test signal VS2 is equal to the potential of the threshold signal Vsh, the change amount ΔVv1 corresponding to the test signal VS2 is the boundary IO. Therefore, when the potential of the test signal VS2 is equal to the potential of the threshold signal Vsh, no offset occurs at the boundary IO.

In this case, the slope in the region where the gain of the column amplifying unit 20a is set to one is corrected so as to deviate from the desired slope. However, compared to the case where the offset occurs at the boundary IO, the change in the digital signal value with respect to the change amount ΔVv1 (that is, the incident light amount) is gentle, so that the influence on the image quality is less likely to occur.

Thus, when the linearity of the column amplifying unit 20a is poor, the difference between the potential of the test signal VS2 and the potential of the threshold signal Vsh is preferably small. Therefore, in the present embodiment, an operation of adjusting for reducing the difference between the potential of the test signal VS2 and the potential of the threshold signal Vsh (correction value calculation potential adjusting operation) is added.

Figure 23:
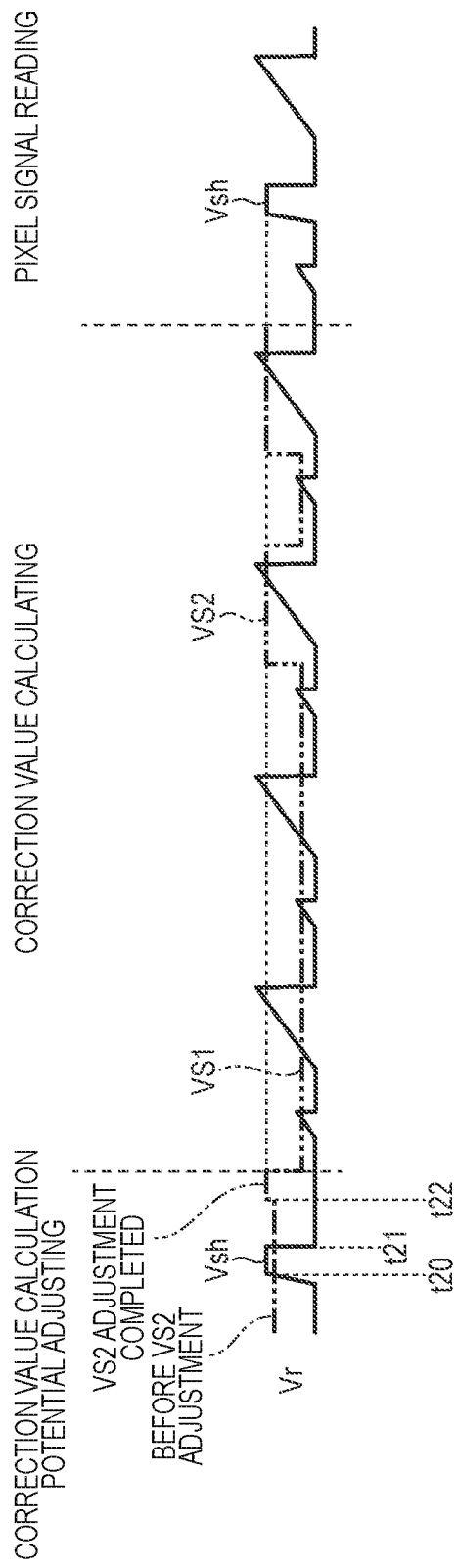
FIG. 23 is a timing chart illustrating a correction value calculation potential adjusting operation according to the second embodiment.

FIG. 23 is a timing chart illustrating a correction value calculation potential adjusting operation according to the present embodiment. FIG. 23 schematically illustrates waveforms of the reference signal Vr and the test signals VS1 and VS2 in the correction value calculation potential adjusting operation (third driving mode), the correction value calculating operation (first driving mode), and the pixel signal reading operation (second driving mode). Since the correction value calculating operation and the pixel signal reading operation are the same as those in FIGS. 19 and 17, respectively, description thereof will be omitted. Further, regarding the correction value calculation potential adjusting operation, the description of the already described operation will be simplified.

The correction value calculation potential adjusting operation in FIG. 23 will be described. During a period from time t20 to time t21, the potential of the reference signal Vr input to the comparison gain setting circuit 310 becomes the potential of the threshold signal Vsh. During the period from time t20 to time t21, the test signal VS2 is output from the test signal supply unit 200 to the column signal line 2. The comparison gain setting circuit 310 compares the potential of the test signal VS2 with the potential of the threshold signal Vsh.

When the potential of the test signal VS2 is equal to or greater than the potential of the threshold signal Vsh, the comparison gain setting circuit 310 outputs the H-level setting signal ATT. Conversely, when the potential of the test signal VS2 is less than the potential of the threshold signal VREF, the comparison gain setting circuit 310 outputs the L-level setting signal ATT. The flag memory 501 holds a setting signal ATT output from the comparison gain setting circuit 310. The horizontal scanning circuit 60 sequentially scans the flag memory 501 of each column, and transfers an H-level or L-level digital signal to the DSP 80.

At time t22, the DSP 80 outputs a control signal for changing the potential of the test signal VS2 to the test signal supply unit 200 based on the level of the digital signal transferred from the flag memory 501. The DSP 80 outputs a control signal for decreasing the potential of the test signal VS2 when the level of the digital signal transferred from the flag memory 501 is the H level, and outputs a control signal for increasing the potential of the test signal VS2 when the level of the digital signal is the L level. FIG. 23 illustrates an example in which the potential of the test signal VS2 is raised to approximately the same level as the potential of the threshold signal Vsh.

Thus, the difference between the potential of the test signal VS2 and the potential of the threshold signal Vsh can be reduced. After the above-described correction value calculation potential adjusting operation is completed, the above-described correction value calculating operation and pixel signal reading operation are performed using the adjusted test signal VS2. In this way, by performing the correction operation of the test signal VS2 by the DSP 80, as described with reference to FIGS. 21 and 22, it is possible to reduce the offset that can occur at the boundary IO.

The threshold signal Vsh is generated by the reference signal supply unit 25, and the test signal VS2 is generated by supplying a potential from the test signal supply unit 200 to the column signal lines 2. As described above, since the potentials of the two signals differ from each other at the generation point and the generation method, even if the two signals are designed to have the same potential, the potentials of the two signals may be different from each other due to process variations during manufacturing or the like. In the present embodiment, the difference between the potential of the threshold signal Vsh and the potential of the test signal VS2 is determined by the comparison circuit 301, and the processing of reducing the difference is performed, so that the difference between the potentials may be reduced even if there are process variations or the like.

As described above, by performing the process of reducing the difference between the potential of the test signal VS2 and the potential of the threshold signal Vsh, the offset of the digital signal value occurring at the boundary IO due to the linearity shift of the column amplifying unit 20a can be reduced. Therefore, according to the present embodiment, it is possible to provide the photoelectric conversion device 100 capable of further reducing the correction error.

The correction value calculation potential adjusting operation and the correction value calculating operation in the present embodiment may be performed when the photoelectric conversion device 100 is powered on. The correction value calculation potential adjusting operation and the correction value calculating operation according to the present embodiment may be performed during a blanking period after the vertical scanning circuit 15 scans all the rows of the pixel unit 10 until the next scan of the pixel unit 10 is started. The correction value calculation potential adjusting operation and the correction value calculating operation according to the present embodiment may be performed when the imaging mode (signal acquisition mode) of a moving image, a still image, or the like is changed.

Although the linearity shift of the column amplifying unit 20a is exemplified as the cause of the linearity shift, a signal output from a circuit element other than the column amplifying unit 20a or a circuit element other than the column amplifying unit 20a may be a cause of the linearity shift. Even in such a case, the correction method of the present embodiment is effective.

Third Embodiment

In the above-described embodiments, the offset can be reduced by reducing the difference between the potential of the test signal and the potential of the threshold signal. In the present embodiment, the range of the difference between the potential of the test signal and the potential of the threshold signal which can more suitably reduce the offset will be described.

Figure 24:
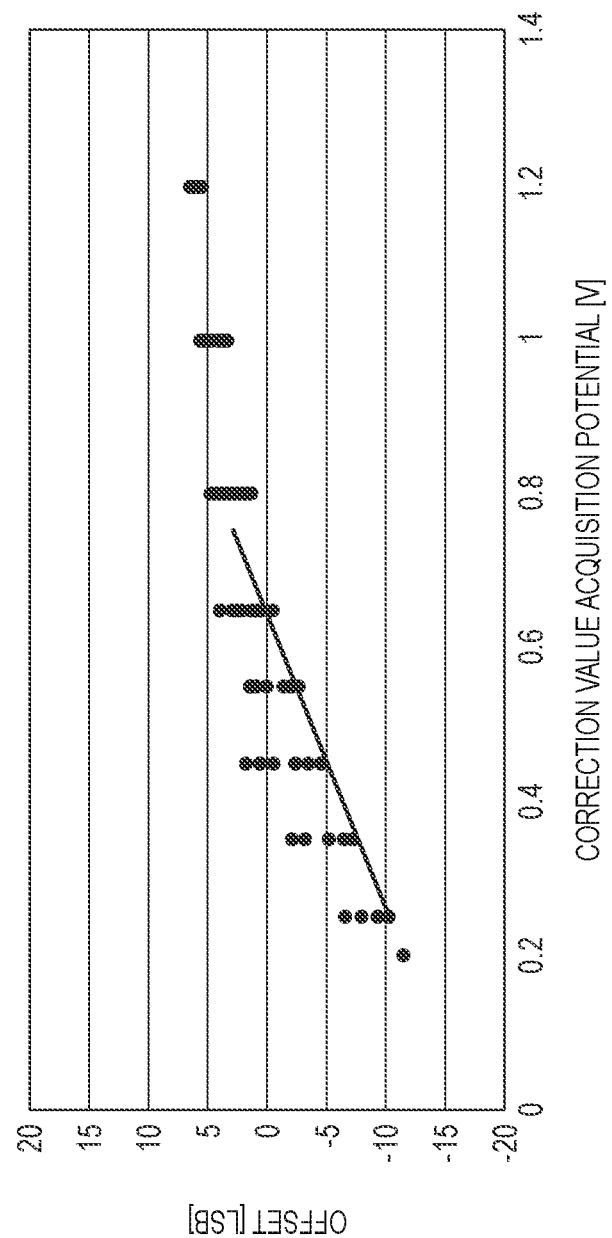
FIG. 24 is a graph illustrating a relationship between a test signal and an offset according to a third embodiment.

FIG. 24 is a graph illustrating the relationship between the test signal VS2 and the offset according to the third embodiment. FIG. 24 illustrates measured values of the offset when the potential of the test signal VS2 is changed in the configuration of the third embodiment. The horizontal axis of FIG. 24 represents the potential (V) for acquiring a correction value input to the comparison circuit 301 based on the test signal VS2. Note that the potentials illustrated in FIG. 24 are acquired after the column amplifying unit 20a, and include the influence of the gain of the column amplifying unit 20a. The vertical axis of FIG. 24 represents the degree of offset in units of the least significant bit (LSB) of the digital signal.

The slope of the approximation line illustrated in FIG. 24 is approximately 3 LSB/0.1V. When the potential deviation of the correction value acquisition potential from the optimal potential at which the offset is zero (about 0.6 V in the example of FIG. 24) is allowed to be about ±5%, the magnitude of the offset can be reduced to about 1 LSB or less, and the offset can be sufficiently reduced. Therefore, it is desirable that the difference between the correction value acquisition potential and the threshold signal Vsh be within ±5%. In other words, after the potential is controlled by the correction value calculation potential adjusting operation, the ratio of the potential of the signal acquired by amplifying the test signal VS2 by the first gain to the threshold signal Vsh is preferably 0.95 or more and 1.05 or less. The example of FIG. 24 is an example of actually measured values in the configuration of the second embodiment, but the same applies to the configuration of the first embodiment. That is, after the control of the correction value calculation potential adjustment operation potential, the ratio of the potential of the test signal VS2 to the threshold signal VREF is preferably 0.95 or more and 1.05 or less.

Fourth Embodiment

In the above-described embodiment, the test signal supply unit 200 may be any one as long as the test signals VS1 and VS2 can be supplied and the potential of the test signal VS2 can be changed by a control signal from the DSP 80. Although the configuration of the test signal generation circuit for supplying the test signals VS1 and VS2 is not particularly limited, an example of the test signal generation circuit will be described in the present embodiment.

Figure 25:
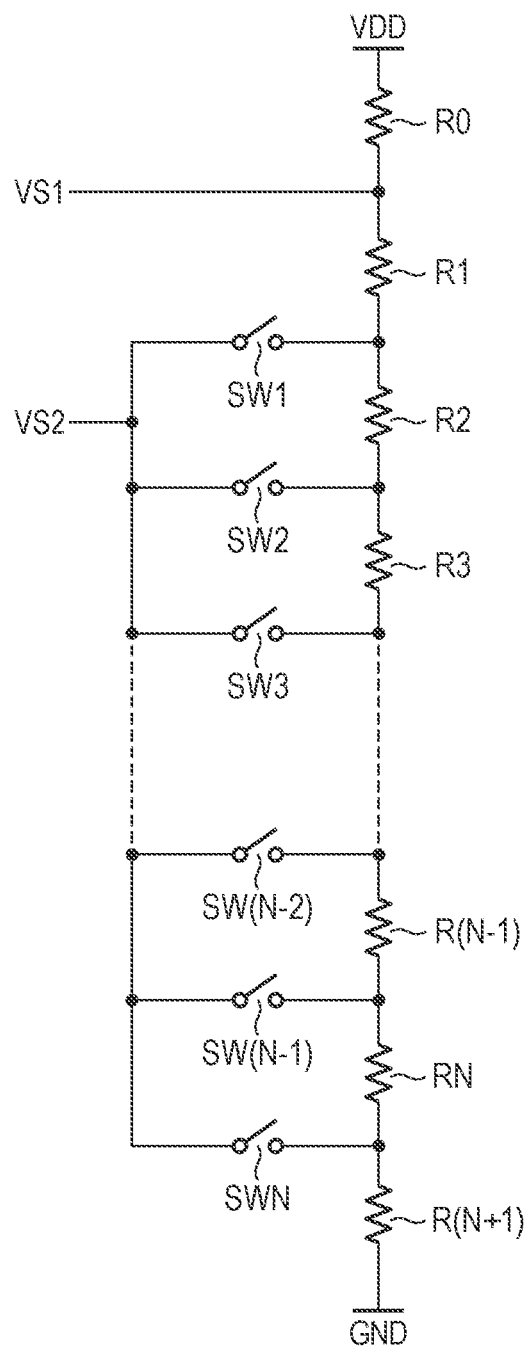
FIG. 25 is a circuit diagram of a test signal generation circuit according to a fourth embodiment.

FIG. 25 is a circuit diagram of a test signal generation circuit according to the present embodiment. The test signal generation circuit has N switches SW1 to SWN and N+2 resistors R0 to R(N+1) (N is an integer of 2 or more).

The resistors R0 to R(N+1) are connected in series between a potential wiring having a power supply potential VDD and a ground wiring having a ground potential GND. A node between the resistor R0 and the resistor R1 is an output terminal of the test signal VS1. First terminals of the switches SW1 to SWN are mutually connected and are output terminals of the test signal VS2. A second terminal of the switch SW1 is connected to a node between the resistors R1 and R2. A second terminal of the switch SW2 is connected to a node between the resistors R2 and R3. The switches SW3 to SWN have the same connection relationship. A control signal output from the DSP 80 is input to the control terminals of the switches SW1 to SWN. This control signal turns on any one of the switches SW1 to SWN and turns off the other N−1 of the switches. The output terminal of the test signal VS2 has a different potential depending on the switch turned on. Therefore, the switches SW1 to SWN and the N+2 resistors R0 to R(N+1) of the test signal generation circuit of the present embodiment form a digital-to-analog conversion circuit that generates an analog potential based on the digital control signal output from the DSP 80.

By adopting the test signal generation circuit of FIG. 25, the potential of the test signal VS1 can be fixed, and the potential of the test signal VS2 can be variable by a control signal from the DSP 80.

Fifth Embodiment

Figure 26:
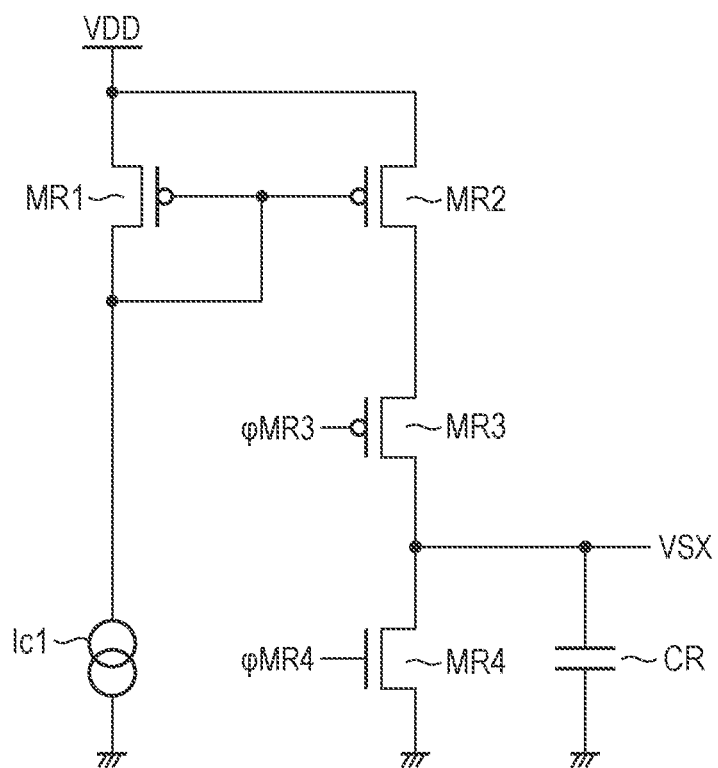
FIG. 26 is a circuit diagram of a test signal generation circuit according to a fifth embodiment.

In this embodiment, another example of the test signal generation circuit will be described. FIG. 26 is a circuit diagram of a test signal generation circuit according to the present embodiment. The test signal generation circuit includes a current source Ic1, transistors MR1, MR2, MR3, and MR4, and a capacitor CR. The transistors MR1, MR2, and MR3 are PMOS transistors, and the transistor MR4 is an NMOS transistor.

The drain of the transistor MR1, the gate of the transistor MR1, and the gate of the transistor MR2 are connected to the current source Ic1. The source of the transistor MR1 and the source of the transistor MR2 are connected to a potential wiring having a power supply potential VDD. The drain of the transistor MR2 is connected to the source of the transistor MR3. The drain of the transistor MR3 is connected to the drain of the transistor MR4 and a first terminal of the capacitor CR. The source of the transistor MR4 and a second terminal of the capacitor CR are connected to the ground wiring.

The transistor MR3 is controlled to be turned on or off based on a control signal φMR3 output from the DSP 80. The transistor MR4 is controlled to be turned on or off based on a control signal φMR4 output from the DSP 80. The connection node of the drain of the transistor MR3, the drain of the transistor MR4, and the first terminal of the capacitor CR is the output terminal VSX of the test signal generation circuit. The test signal VS1 or the test signal VS2 is output from the output terminal VSX.

The transistor MR1 and the transistor MR2 form a current mirror circuit, and when the transistor MR3 is turned on, a constant current flows through the transistor MR2 and the transistor MR3. By setting both of the control signals φMR3 and φMR4 to the L level, the transistor MR3 is turned on and the transistor MR4 is turned off. At this time, charges based on the constant current flowing through the transistor MR2 and the transistor MR3 are charged in the capacitor CR. The potential of the first terminal of the capacitor CR rises substantially linearly in accordance with the time when the constant current flows. Thus, the test signal generation circuit of the present embodiment operates as a ramp signal generation circuit. Therefore, the potential of the output terminal VSX can be controlled in accordance with the time width of the pulse for setting the control signals φMR3 and φMR4 to the L level.

The test signal generation circuit of FIG. 26 can generate a desired potential in accordance with the time width of the pulse. By adopting the test signal generation circuit of FIG. 25, the potential of the test signal VS1 and the variable potential of the test signal VS2 can be generated by the control signal from the DSP 80.

The test signal generation circuits of the fourth and fifth embodiments are applicable to the power sources (VS1, VS2) in the test signal selection unit 201 of FIG. 3 or the power sources (VS0_1, VS0_2, VS0_3) in the test signal supply unit 200 of FIG. 16. In this case, the multiplexers illustrated in these figures may be omitted.

Sixth Embodiment

The photoelectric conversion device 100 of the present embodiment is a modified example of the correction value calculation potential adjusting operation in FIG. 12 of the first embodiment. Other elements are the same as those in the first embodiment, and therefore, description thereof will be omitted.

Figure 27:
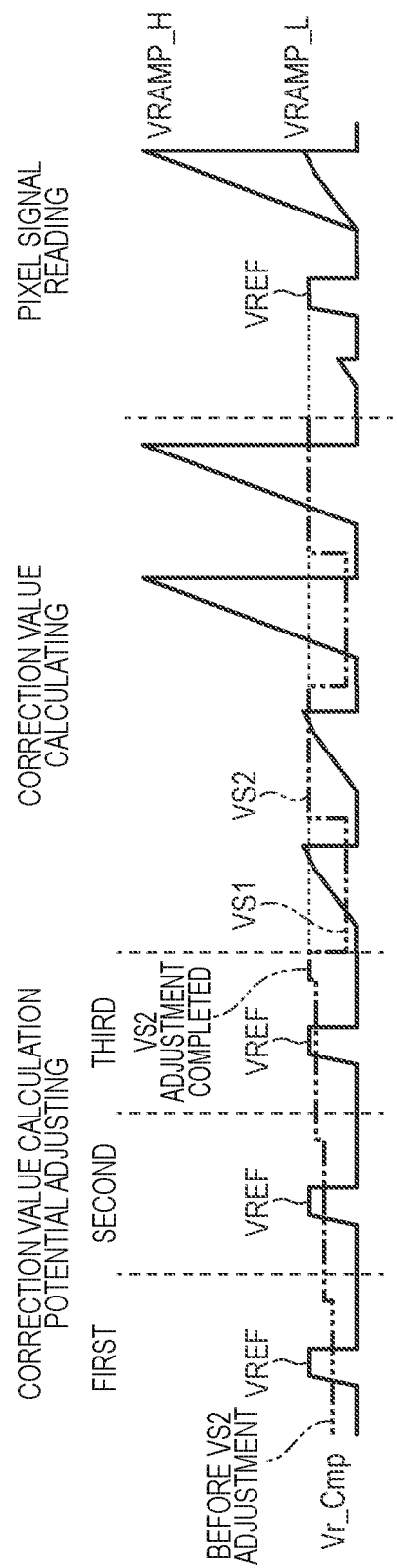
FIG. 27 is a timing chart illustrating a correction value calculation potential adjusting operation according to a sixth embodiment.

FIG. 27 is a timing chart illustrating a correction value calculation potential adjusting operation according to the present embodiment. In the photoelectric conversion device 100 of the present embodiment, the same operation as the correction value calculation potential adjusting operation illustrated in FIG. 12 is performed a plurality of times (in the example of FIG. 27, the operation is performed three times). As illustrated in FIG. 27, the difference between the potential of the test signal VS2 and the potential of the threshold signal VREF can be further reduced by comparing the potential of the test signal VS2 with the potential of the threshold signal VREF and repeating the operation of reducing the difference between the two a plurality of times. Therefore, according to the present embodiment, since the offset can be further reduced, the photoelectric conversion device 100 capable of further reducing the correction error can be provided.

The number of times of the correction value calculation potential adjusting operation may be determined in advance, or may be repeated until the difference between the potential of the test signal VS2 and the potential of the threshold signal VREF falls within a predetermined range. The predetermined range may be within ±5% for the reason described in the third embodiment, for example.

Seventh Embodiment

The photoelectric conversion device 100 of the present embodiment is a modified example of the correction value calculation potential adjusting operation in FIG. 12 of the first embodiment or FIG. 27 of the sixth embodiment. Other elements are the same as those in the first embodiment or the sixth embodiment, and thus description thereof will be omitted.

Figure 28:
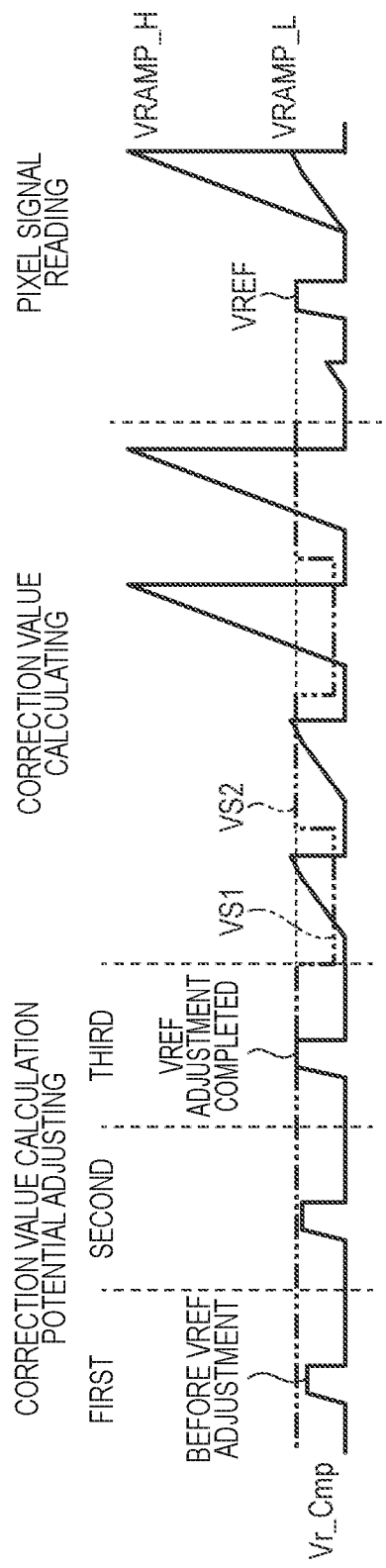
FIG. 28 is a timing chart illustrating a correction value calculation potential adjusting operation according to a seventh embodiment.

FIG. 28 is a timing chart illustrating a correction value calculation potential adjusting operation according to the present embodiment. As illustrated in FIG. 28, the photoelectric conversion device 100 of the present embodiment differs from the first or sixth embodiment in that the potential of the threshold signal VREF is changed instead of changing the potential of the test signal VS2 in the correction value calculation potential adjusting operation. The process of changing the potential of the threshold signal VREF is performed by the TG 70 controlling the reference signal supply unit 25.

When the potential of the test signal VS2 is equal to or greater than the potential of the threshold signal VREF, the comparison circuit 301 outputs the comparison result signal CMP of the L level. Conversely, when the potential of the test signal VS2 is less than the potential of the threshold signal VREF, the comparison circuit 301 outputs the comparison result signal CMP of the H level. The comparison result signal CMP is held in the flag memory 501. The horizontal scanning circuit 60 sequentially scans the flag memory 501 of each column, and transfers an H-level or L-level digital signal to the DSP 80.

The DSP 80 outputs a control signal for changing the potential of the threshold signal VREF to the TG 70 based on the comparison result signal CMP. The TG 70 outputs a control signal for changing the potential of the threshold signal VREF to the reference signal supply unit 25 based on the control signal. In this process, when the comparison result signal CMP is at the L level, a control signal for increasing the potential of the threshold signal VREF is output, and when the comparison result signal CMP is at the H level, a signal for decreasing the potential of the threshold signal VREF is output. Thus, the difference between the potential of the test signal VS2 and the potential of the threshold signal VREF can be reduced, and the offset of the digital signal value occurring at the boundary IO can be reduced. Therefore, according to the present embodiment, it is possible to provide the photoelectric conversion device 100 capable of further reducing the correction error.

Note that the number of times of the correction value calculation potential adjustment operation may be one, but as illustrated in FIG. 28, the correction value calculation potential adjustment operation may be performed a plurality of times (in the example of FIG. 28, the correction value calculation potential adjustment operation is performed three times). Thus, similarly to the sixth embodiment, the difference between the potential of the test signal VS2 and the potential of the threshold signal VREF can be further reduced by repeating the operation of reducing the difference between the two plural times.

Further, in the correction value calculation potential adjusting operation, in addition to changing the potential of the test signal VS2 as in the first embodiment or the like, the potential of the threshold signal VREF may be changed as in the present embodiment. In other words, both the potential of the test signal VS2 and the potential of the threshold signal VREF may be changed. In this case, the difference between the potential of the test signal VS2 and the potential of the threshold signal VREF can also be reduced.

Eighth Embodiment

The photoelectric conversion device 100 of the present embodiment is a modified example of the correction value calculation potential adjusting operation in FIG. 12 of the first embodiment. Other elements are the same as those in the first embodiment, and therefore, description thereof will be omitted.

Figure 29:
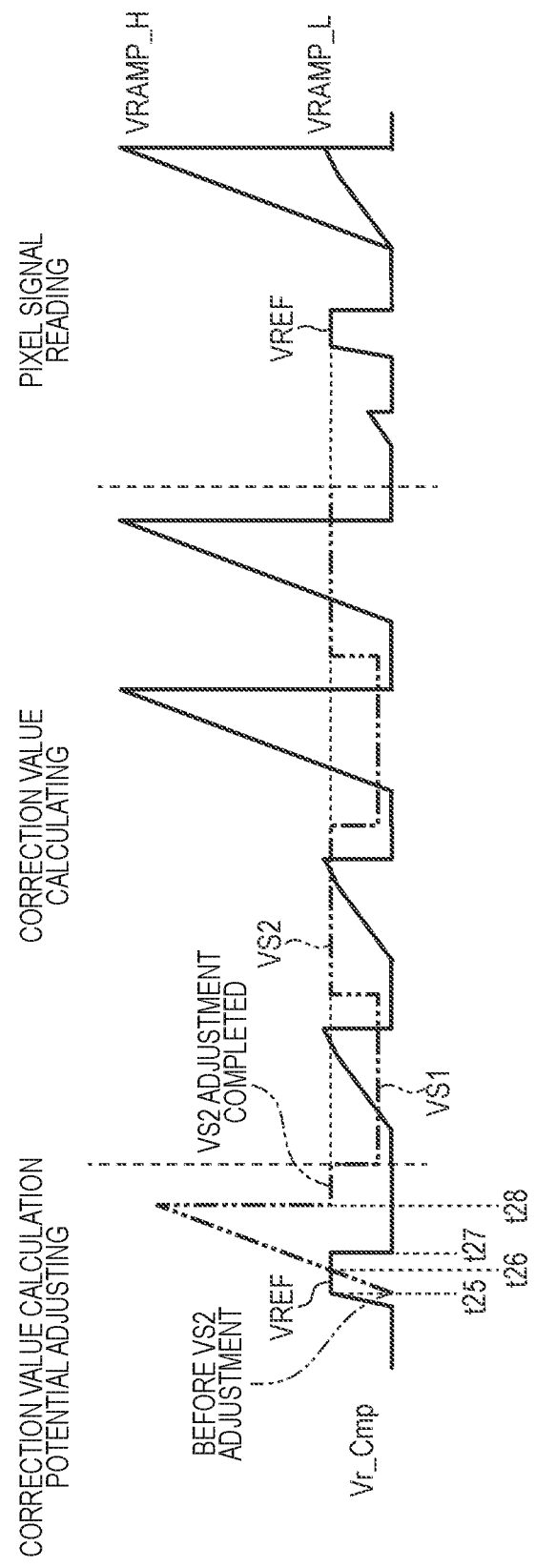
FIG. 29 is a timing chart illustrating a correction value calculation potential adjusting operation according to an eighth embodiment.

FIG. 29 is a timing chart illustrating a correction value calculation potential adjusting operation according to the present embodiment. As illustrated in FIG. 29, the photoelectric conversion device 100 of the present embodiment is capable of operating to change the potential of the test signal VS2 in accordance with time. A ramp signal generation circuit as illustrated in FIG. 26 may be used to generate the test signal VS2 whose potential changes in accordance with time.

At time t25, the test signal supply unit 200 starts changing the potential of the test signal VS2 depending on time. The counter 40 starts an operation of counting the clock signal CLK and outputting a count signal.

At time t26, the magnitude relation between the potential of the test signal VS2 and the potential of the threshold signal VREF is changed, and the signal value of the comparison result signal CMP changes. The memory unit 50 holds the count value at time t26 in the memory unit 50. At time t27, the counter 40 ends counting. The horizontal scanning circuit 60 transfers the count value held in the memory unit 50 to the DSP 80.

At time t28, the DSP 80 outputs a control signal for changing the potential of the test signal VS2 to the test signal supply unit 200 based on the count value. Thus, the potential of the test signal VS2 is adjusted so as to coincide with the potential of the threshold signal VREF.

In the present embodiment, the difference between the potential of the test signal VS2 and the potential of the threshold signal VREF can be reduced more suitably in one process by measuring the potential that matches the potential of the threshold signal VREF by changing the potential of the test signal VS2. Therefore, according to the present embodiment, since the offset can be further reduced, the photoelectric conversion device 100 capable of further reducing the correction error can be provided.

Ninth Embodiment

Figure 30:
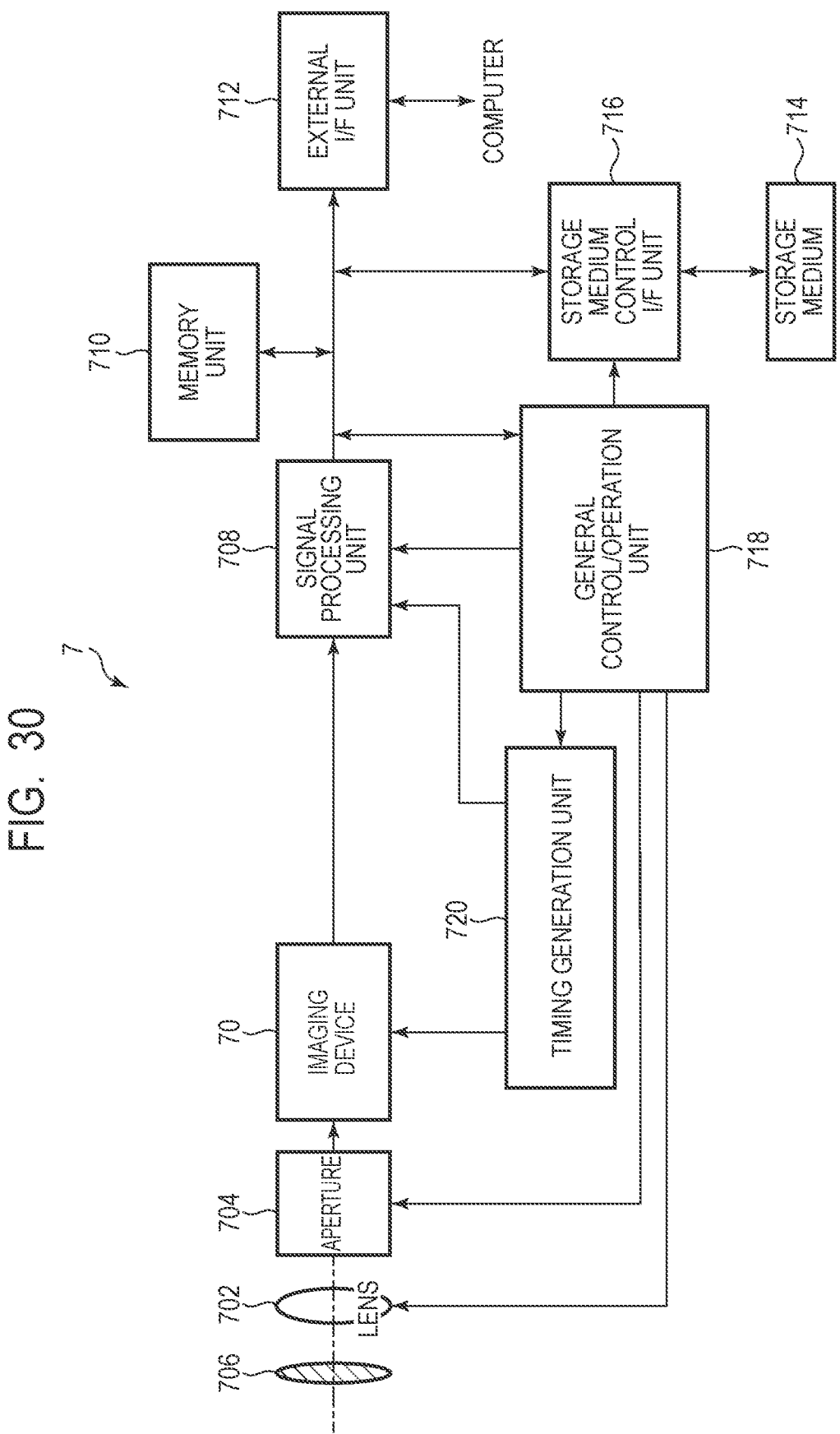
FIG. 30 is a block diagram of equipment according to a ninth embodiment.

The photoelectric conversion device in the above-described embodiments can be applied to various equipment. Examples of the equipment include a digital still camera, a digital camcorder, a camera head, a copier, a fax machine, a cellular phone, an in-vehicle camera, an observation satellite, and a surveillance camera. FIG. 30 is a block diagram of a digital still camera as an example of the equipment.

The equipment 7 illustrated in FIG. 30 includes a barrier 706, a lens 702, an aperture 704, and an imaging device 70 (an example of the photoelectric conversion device). The equipment 7 further includes a signal processing unit (processing device) 708, a timing generation unit 720, a general control/operation unit 718 (control device), a memory unit 710 (storage device), a storage medium control I/F unit 716, a storage medium 714, and an external I/F unit 712. At least one of the barrier 706, the lens 702, and the aperture 704 is an optical device corresponding to the equipment. The barrier 706 protects the lens 702, and the lens 702 forms an optical image of an object on the imaging device 70. The aperture 704 varies the amount of light passing through the lens 702. The imaging device 70 is configured as in the above-described embodiment, and converts an optical image formed by the lens 702 into image data (image signal). The signal processing unit 708 performs various types of correction, data compression, and the like on the image data output from the imaging device 70. The timing generation unit 720 outputs various timing signals to the imaging device 70 and the signal processing unit 708. The general control/operation unit 718 controls the overall digital still camera, and the memory unit 710 temporarily stores image data. The storage medium control I/F unit 716 is an interface for storing or reading image data in or from the storage medium 714, and the storage medium 714 is a removable storage medium such as a semiconductor memory for storing or reading image data. The external I/F unit 712 is an interface for communicating with an external computer or the like. The timing signal or the like may be input from the outside of the equipment. Further, the equipment 7 may include a display device (a monitor, an electronic finder, or the like) for displaying information acquired by the photoelectric conversion device. The equipment includes at least a photoelectric conversion device. Further, the equipment 7 includes at least one of an optical device, a control device, a processing device, a display device, a storage device, and a mechanical device that operates based on information acquired by the photoelectric conversion device. The mechanical device is a movable unit (for example, a robot arm) that operates upon receipt of a signal from the photoelectric conversion device.

Each pixel may include a plurality of photoelectric conversion units (a first photoelectric conversion unit and a second photoelectric conversion unit). The signal processing unit 708 may be configured to process the pixel signal based on the charges generated in the first photoelectric conversion unit and the pixel signal based on the charges generated in the second photoelectric conversion unit, and acquire the distance information from the imaging device 70 to an object.

Tenth Embodiment

Figure 31A:
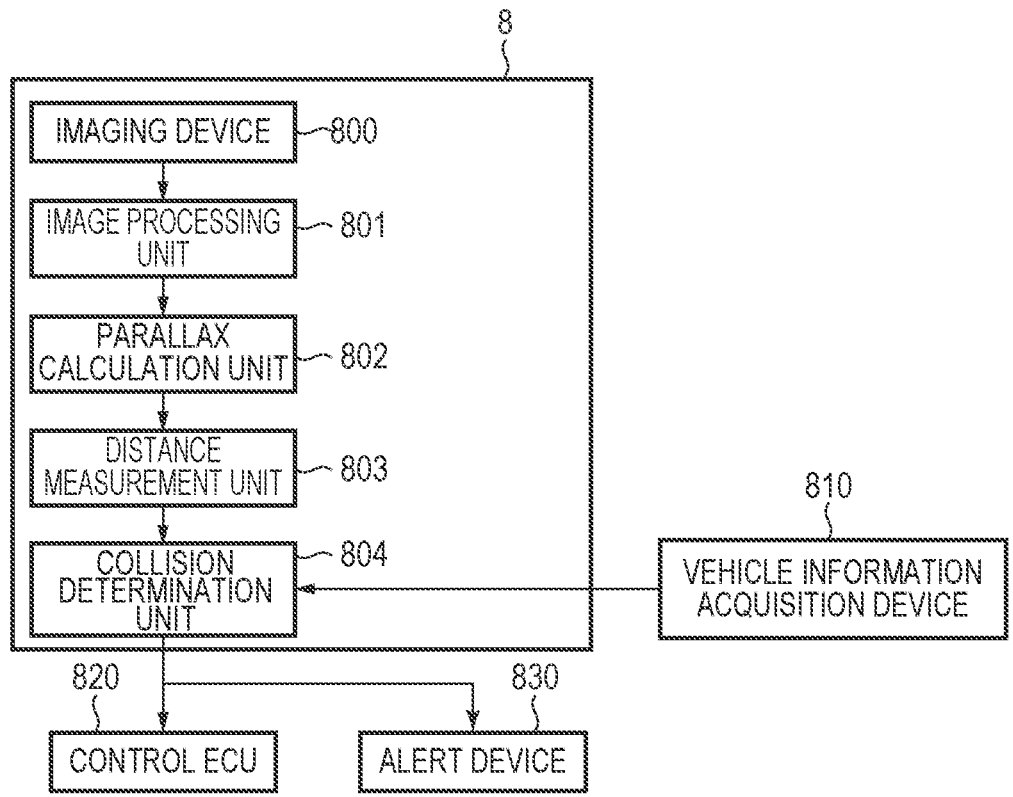
FIGS. 31A and 31B are block diagrams of equipment according to a tenth embodiment.
Figure 31B:
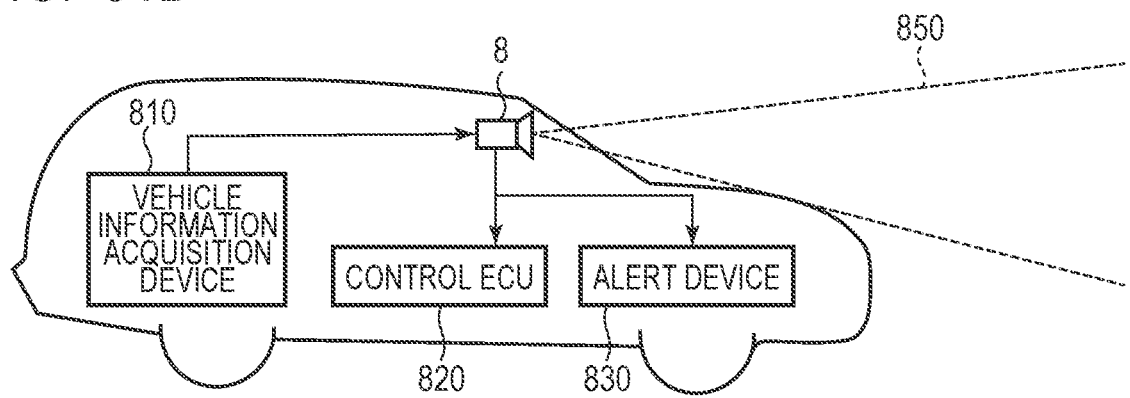

FIGS. 31A and 31B are block diagrams of equipment relating to an in-vehicle camera of the present embodiment. Equipment 8 includes the imaging device 800 (an example of a photoelectric conversion device) according to the above-described embodiment, and a signal processing device (processing device) that processes a signal from the imaging device 800. The equipment 8 includes an image processing unit 801 that performs image processing on a plurality of image data acquired by the imaging device 800, and a parallax calculation unit 802 that calculates parallax (phase difference of parallax images) from the plurality of image data acquired by the equipment 8. Further, the equipment 8 includes a distance measurement unit 803 that calculates a distance to an object based on the calculated parallax, and a collision determination unit 804 that determines whether there is a possibility of collision based on the calculated distance. Here, the parallax calculation unit 802 and the distance measurement unit 803 are an example of a distance information acquisition means for acquiring distance information to the object. That is, the distance information is information related to parallax, defocus amount, distance to the object, and the like. The collision determination unit 804 may determine the possibility of collision using any of the distance information. The distance information acquisition means may be realized by dedicatedly designed hardware, or may be realized by a software module. It may be realized by a field programmable gate array (FPGA), an application specific integrated circuit (ASIC) or a combination thereof.

The equipment 8 is connected to a vehicle information acquisition device 810, and can acquire vehicle information such as a vehicle speed, a yaw rate, and a steering angle. A control ECU 820, which is a control device that outputs a control signal for generating braking force to the vehicle based on the determination result of the collision determination unit 804, is connected to the equipment 8. The equipment 8 is also connected to an alert device 830 that issues an alert to a driver based on the determination result of the collision determination unit 804. For example, when the possibility of collision is high as the determination result of the collision determination unit 804, the control ECU 820 performs vehicle control for avoiding collision or reducing damage by applying a brake, returning an accelerator, suppressing engine output, or the like. The alert device 830 alerts a user by sounding an alert such as a sound, displays alert information on a screen of a car navigation system or the like, providing a warning to the user by applying vibration to a seatbelt or steering, or the like. The equipment 8 functions as a control means for controlling the operation of controlling the vehicle as described above.

In the present embodiment, an image of the periphery of the vehicle, for example, the front or the rear is taken by the equipment 8. FIG. 31B illustrates equipment when capturing an image of the front of the vehicle (image capturing range 850). The vehicle information acquisition device 810 serving as an imaging control means sends an instruction to the equipment 8 or the imaging device 800 to perform an imaging operation. With such a configuration, the accuracy of distance measurement can be further improved.

Although the example of control for avoiding a collision to another vehicle has been described above, the embodiment is applicable to automatic driving control for following another vehicle, automatic driving control for not going out of a traffic lane, or the like. Furthermore, the equipment is not limited to a vehicle such as an automobile and can be applied to a movable body (movable apparatus) such as a ship, an airplane, a satellite, an industrial robot and a consumer use robot, or the like, for example. In addition, the equipment can be widely applied to equipment which utilizes object recognition or biometric authentication, such as an intelligent transportation system (ITS), a surveillance system, or the like without being limited to movable bodies.

MODIFIED EMBODIMENTS

The present invention is not limited to the above-described embodiments, and various modifications are possible. For example, an example in which a configuration of a part of any embodiment is added to another embodiment or an example in which a configuration of a part of any embodiment is replaced with a configuration of a part of another embodiment is also an embodiment of the present invention.

The photoelectric conversion device 100 of the above-described embodiment may be of a non-stack type in which all the configurations of FIG. 1 or 13 are arranged in a semiconductor substrate, but may be of a stacked type in which these configurations are arranged in a plurality of semiconductor substrates stacked on each other. In the case of a stacked type in which a first substrate and a second substrate are stacked, the pixel unit 10 may be arranged in the first substrate. In the second substrate different from the first substrate, a part or the whole of the configuration of FIG. 1 or 13 other than the pixel unit 10 may be arranged. Alternatively, it may be a stacked type in which a third substrate different from the first substrate and the second substrate is further stacked. In this case, a part of the configuration of FIG. 1 or 13 may be disposed on the second substrate and the third substrate.

The functions in the DSP 80 illustrated in FIG. 4 are merely an example and it is not limited thereto. Functions other than the configuration of FIG. 4 may be further included, or a part of the functions may be realized by another device. For example, at least one of the correction value acquisition unit 82 and the correction calculation unit 83 may be arranged in an external device of the photoelectric conversion device 100.

Although the sixth to eighth embodiments are described as modified examples of the first embodiment, the configuration of the second embodiment may be modified to perform the same correction value calculation potential adjusting operation as the sixth to eighth embodiments.

The disclosure of this specification includes a complementary set of the concepts described in this specification. That is, for example, if the description of "A is B" (A=B) is provided in this specification, this specification is intended to disclose or suggest that "A is not B" even if the description of "A is not B" (A B) is omitted. This is because it is assumed that "A is not B" is considered when "A is B" is described.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-128523, filed Aug. 4, 2021, which is hereby incorporated by reference herein in its entirety.

What is claimed is:

1. A photoelectric conversion device comprising:
a pixel configured to output a signal corresponding to an amount of received light;
a reference signal supply unit configured to output a first reference signal whose potential changes depending on time and a second reference signal whose potential changes with a change amount per unit time greater than that of the first reference signal;
an analog-to-digital conversion unit including a comparison circuit configured to compare a potential of an input signal with a potential output from the reference signal supply unit and output a comparison result signal, and performing analog-to-digital conversion of an input signal based on the comparison result signal; and
a selection circuit configured to select one of the first reference signal and the second reference signal to input the selected signal to the comparison circuit,
wherein in a first driving mode in which a correction value of signals converted based on the first reference signal and the second reference signal is acquired,
the analog-to-digital conversion unit generates a first digital signal based on a comparison result signal output by comparing a first analog signal with the first reference signal by the comparison circuit, and generates a second digital signal based on a comparison result signal output by comparing the first analog signal with the second reference signal by the comparison circuit, and
the correction value is acquired based on the first digital signal and the second digital signal,
wherein in a second driving mode in which a pixel signal based on an output from the pixel is read out,
the comparison circuit compares a potential of the pixel signal with a potential of a threshold signal,
the selection circuit selects the first reference signal when the potential of the pixel signal is less than the potential of the threshold signal, and selects the second reference signal when the potential of the pixel signal is equal to or greater than the potential of the threshold signal, and
the analog-to-digital conversion unit performs analog-to-digital conversion of the pixel signal using the selected first reference signal or second reference signal, and
wherein in a third driving mode in which at least one of the first analog signal and the threshold signal is controlled,
based on a comparison result signal output by comparing the first analog signal with the threshold signal by the comparison circuit, at least one of the first analog signal and the threshold signal is controlled to reduce a difference between a potential of the first analog signal and a potential of the threshold signal.

2. The photoelectric conversion device according to claim 1, wherein after the control in the third driving mode, a ratio of the potential of the first analog signal to the potential of the threshold signal is 0.95 or more and 1.05 or less.

3. The photoelectric conversion device according to claim 1, wherein in the first driving mode,
the analog-to-digital conversion unit generates a third digital signal based on a comparison result signal output by comparing a second analog signal different from the first analog signal with the first reference signal by the comparison circuit, and generates a fourth digital signal based on a comparison result signal output by comparing the second analog signal with the second reference signal by the comparison circuit, and
the correction value is acquired based on the first digital signal, the second digital signal, the third digital signal, and the fourth digital signal.

4. The photoelectric conversion device according to claim 3, wherein in the first driving mode, the correction value is acquired based on a difference between the first digital signal and the third digital signal and a difference between the second digital signal and the fourth digital signal.

5. A photoelectric conversion device comprising:
a pixel configured to output a signal corresponding to an amount of received light;
an amplifying unit configured to amplify an input signal at a first gain or a second gain less than the first gain;
a reference signal supply unit configured to output a reference signal whose potential changes depending on time; and
an analog-to-digital conversion unit including a comparison circuit configured to compare a potential of a signal output from the amplifying unit with a potential of the reference signal and output a comparison result signal, and performing analog-to-digital conversion of an input signal based on the comparison result signal,
wherein in a first driving mode in which a correction value of signals amplified at the first gain and the second gain is acquired,
the analog-to-digital conversion unit generates a first digital signal based on a comparison result signal output by comparing a signal acquired by amplifying the first analog signal at the first gain with the reference signal by the comparison circuit, and generates a second digital signal based on a comparison result signal output by comparing a signal acquired by amplifying the first analog signal at the second gain with the reference signal by the comparison circuit, and
the correction value is acquired based on the first digital signal and the second digital signal,
wherein in a second driving mode in which a pixel signal based on an output from the pixel is read out,
the comparison circuit compares a potential of the pixel signal with a potential of a threshold signal,
in the amplifying unit, the first gain is set when the potential of the pixel signal is less than the potential of the threshold signal, and the second gain is set when the potential of the pixel signal is equal to or greater than the potential of the threshold signal, and
the analog-to-digital conversion unit performs analog-to-digital conversion of the pixel signal amplified at the set first gain or second gain, and wherein in a third driving mode in which at least one of the first analog signal and the threshold signal is controlled, based on a comparison result signal output by comparing a signal acquired by amplifying the first analog signal at the first gain with the threshold signal by the comparison circuit, at least one of the first analog signal and the threshold signal is controlled to reduce a difference between a potential of the signal acquired by amplifying the first analog signal at the first gain and a potential of the threshold signal.

6. The photoelectric conversion device according to claim 5, wherein after the control in the third driving mode, a ratio of the potential of the signal acquired by amplifying the first analog signal at the first gain to the potential of the threshold signal is 0.95 or more and 1.05 or less.

7. The photoelectric conversion device according to claim 5, wherein in the first driving mode, the analog-to-digital conversion unit generates a third digital signal based on a comparison result signal output by comparing a signal acquired by amplifying a second analog signal different from the first analog signal at the first gain with the reference signal by the comparison circuit, and generates a fourth digital signal based on a comparison result signal output by comparing a signal acquired by amplifying the second analog signal at the second gain with the reference signal by the comparison circuit, and the correction value is acquired based on the first digital signal, the second digital signal, the third digital signal, and the fourth digital signal.

8. The photoelectric conversion device according to claim 1, wherein in the third driving mode, the control of reducing the difference in the potentials is performed by changing the first analog signal.

9. The photoelectric conversion device according to claim 1, wherein in the third driving mode, the control of reducing the difference in the potentials is performed by changing the threshold signal.

10. The photoelectric conversion device according to claim 1, wherein the threshold signal is output from the reference signal supply unit.

11. The photoelectric conversion device according to claim 1 further comprising:

a signal line from which the signal is output from the pixel; and an analog signal supply unit configured to output the first analog signal to the signal line.

12. The photoelectric conversion device according to claim 11, wherein in the third driving mode, the control of reducing the difference in the potentials is performed by changing a potential output to the signal line by the analog signal supply unit.

13. The photoelectric conversion device according to claim 11, wherein the analog signal supply unit includes a digital-to-analog conversion circuit.

14. The photoelectric conversion device according to claim 11, wherein the analog signal supply unit includes a ramp signal generation circuit.

15. The photoelectric conversion device according to claim 1, wherein the control in the third driving mode is performed when the photoelectric conversion device is powered on.

16. The photoelectric conversion device according to claim 1, wherein the control in the third driving mode is performed when a signal acquisition mode of the photoelectric conversion device is changed.

17. The photoelectric conversion device according to claim 1, wherein the control in the third driving mode is performed a plurality of times before acquiring the correction value in the first driving mode.

18. The photoelectric conversion device according to claim 1, wherein in the third driving mode, the control of reducing the difference in the potentials based on a comparison result signal acquired in a state in which the potential of the first analog signal is changed depending on time.

19. Equipment comprising:

the photoelectric conversion device according to claim 1; and at least any one of:

an optical device adapted for the photoelectric conversion device, a control device configured to control the photoelectric conversion device, a processing device configured to process a signal output from the photoelectric conversion device, a display device configured to display information obtained by the photoelectric conversion device, a storage device configured to store information obtained by the photoelectric conversion device, and a mechanical device configured to operate based on information obtained by the photoelectric conversion device.

20. The equipment according to claim 19, wherein the processing device processes image signals generated by a plurality of photoelectric conversion units, respectively, and acquires distance information on a distance from the photoelectric conversion device to an object.

* * * * *